(12) United States Patent
Citerin

(10) Patent No.: US 11,288,101 B2
(45) Date of Patent: Mar. 29, 2022

(54) METHOD AND SYSTEM FOR AUTO-SETTING OF IMAGE ACQUISITION AND PROCESSING MODULES AND OF SHARING RESOURCES IN LARGE SCALE VIDEO SYSTEMS

(71) Applicant: CANON KABUSHIKI KAISHA, Tokyo (JP)

(72) Inventor: Johann Citerin, Tregueux (FR)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 16/795,357

(22) Filed: Feb. 19, 2020

(65) Prior Publication Data

US 2020/0272524 A1  Aug. 27, 2020

(30) Foreign Application Priority Data

Feb. 25, 2019  (GB) .................................. 1902525

(51) Int. Cl.
*G06F 9/50* (2006.01)
(52) U.S. Cl.
CPC .......... *G06F 9/5038* (2013.01); *G06F 9/5011* (2013.01); *G06F 9/5083* (2013.01)
(58) Field of Classification Search
CPC ................................................... G06F 9/5038
See application file for complete search history.

(56) References Cited

U.S. PATENT DOCUMENTS

| | | | |
|---|---|---|---|
| 2005/0018766 A1 | 1/2005 | Iwamura | |
| 2007/0233716 A1 | 10/2007 | Kato | |
| 2015/0347262 A1* | 12/2015 | Vyas | ...................... G06F 9/505 |
| | | | 718/104 |
| 2018/0157602 A1* | 6/2018 | Frey | .................... G06F 12/0862 |

FOREIGN PATENT DOCUMENTS

GB          2570449 A         7/2019

* cited by examiner

*Primary Examiner* — Charlie Sun
(74) *Attorney, Agent, or Firm* — Canon U.S.A., Inc. IP Division

(57) ABSTRACT

At least one embodiment of a method of setting a module of a set of image acquisition and processing modules in a video system, the modules sharing one same resource, the method comprising:
  obtaining, for each module, a score function depending on an efficiency value to perform a task to which the module is assigned, a level of consumption of the resource, and a trade-off value characterizing the importance of the efficiency of performing a task relative to resource consumption,
  determining an updated value of the trade-off value of the resource, so that the resource consumption level reaches a threshold;
  identifying settings of the module optimizing a result of the score function of the module when considering the updated trade-off value; and
  setting the module according to the identified settings.

20 Claims, 10 Drawing Sheets

| Gain  | $G_0$                  | $G_1$                  | $G_2$                  | ... | $G_n$                  |
|-------|------------------------|------------------------|------------------------|-----|------------------------|
| Noise | $noise_{current}(G_0)$ | $noise_{current}(G_1)$ | $noise_{current}(G_2)$ | ... | $noise_{current}(G_n)$ |

Fig. 13

| Shutter speed /aperture | $S_0$                    | $S_1$                    | ... | $S_n$                    |
|---|---|---|---|---|
| $A_0$ | $blur_{current}(S_0, A_0)$ | $blur_{current}(S_1, A_0)$ | ... | $blur_{current}(S_n, A_0)$ |
| $A_1$ | $blur_{current}(S_0, A_1)$ | $blur_{current}(S_1, A_1)$ | ... | $blur_{current}(S_n, A_1)$ |
| ...   | ...                        | ...                        | ... | ...                        |
| $A_n$ | $blur_{current}(S_0, A_n)$ | $blur_{current}(S_1, A_n)$ | ... | $blur_{current}(S_n, A_n)$ |

Fig. 14

|       | $A_0$ / $S_0$                    | $S_1$                            |     | $S_n$                            |
|-------|----------------------------------|----------------------------------|-----|----------------------------------|
| $G_0$ | $contrast_{current}(G_0, S_0, A_0)$ | $contrast_{current}(G_0, S_1, A_0)$ | ... | $contrast_{current}(G_0, S_n, A_0)$ |
| $G_1$ | $contrast_{current}(G_1, S_0, A_0)$ | $contrast_{current}(G_1, S_1, A_0)$ | ... | $contrast_{current}(G_1, S_n, A_0)$ |
| ...   |                                  |                                  |     |                                  |
| $G_n$ | $contrast_{current}(G_n, S_0, A_0)$ | $contrast_{current}(G_n, S_1, A_0)$ | ... | $contrast_{current}(G_n, S_n, A_0)$ |

Fig. 15

|       | $A_0$ / $S_0$                 | $S_1$                         |     | $S_n$                         |
|-------|-------------------------------|-------------------------------|-----|-------------------------------|
| $G_0$ | $score_{current}(G_0, S_0, A_0)$ | $score_{current}(G_0, S_1, A_0)$ | ... | $score_{current}(G_0, S_n, A_0)$ |
| $G_1$ | $score_{current}(G_1, S_0, A_0)$ | $score_{current}(G_1, S_1, A_0)$ | ... | $score_{current}(G_1, S_n, A_0)$ |
| ...   |                               |                               |     |                               |
| $G_n$ | $score_{current}(G_n, S_0, A_0)$ | $score_{current}(G_n, S_1, A_0)$ | ... | $score_{current}(G_n, S_n, A_0)$ |

Fig. 16

| Nb images/ ID threshold | $N_0$ | $N_1$ | ... | $N_n$ |
|---|---|---|---|---|
| $\theta_0$ | accuracy($\theta_0$, $N_0$) | accuracy($\theta_0$, $S_1$) | ... | accuracy($\theta_0$, $S_n$) |
| $\theta_1$ | accuracy($\theta_1$, $S_0$) | accuracy($\theta_1$, $S_1$) | ... | accuracy($\theta_1$, $S_n$) |
| $\theta_2$ | accuracy($\theta_2$, $S_0$) | accuracy($\theta_2$, $S_1$) | ... | accuracy($\theta_2$, $S_n$) |
| ... | ... | ... | ... | ... |
| $\theta_n$ | accuracy($\theta_n$, $S_0$) | accuracy($\theta_n$, $S_1$) | ... | accuracy $\theta_n$, $S_n$) |

Fig. 17

METHOD AND SYSTEM FOR AUTO-SETTING OF IMAGE ACQUISITION AND PROCESSING MODULES AND OF SHARING RESOURCES IN LARGE SCALE VIDEO SYSTEMS

This application claims the benefit under 35 U.S.C. § 119(a)-(d) of United Kingdom Patent Application No. 1902525.3, filed on Feb. 25, 2019 and entitled "method and system for auto-setting of image acquisition and processing modules and of sharing resources in large scale video systems". The above cited patent application is incorporated herein by reference in its entirety.

FIELD OF THE INVENTION

The present invention relates to the technical field of setting video systems comprising cameras, image processing modules, and shared resources and to a method and a system for auto-setting of image acquisition and processing modules and of sharing resources, in particular in large scale video systems, for example in large scale video surveillance systems.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal event detection, traffic monitoring, customer behaviour, or general data gathering.

The ever-increasing use of network cameras for such purposes has led in particular to increasing image quality, especially to improving image resolution, contrast, and colour.

However, it has been observed that image quality improvement is slowing recently. Indeed, while the camera sensors embedded in recent cameras may provide high quality outputs, image quality highly depends on camera settings that are often not optimal. Motion blur, bad exposure, and a wrong choice of network settings, that may be combined with a bad choice of resource allocation, lead very often to poor images.

It has also been observed that there are no more significant decreases in the costs of large-scale video systems. This results from the costs associated with the installation and the maintenance of the video systems that exceed all cost decreases. In many cases, the increases in cost are related to the management complexity of the large-scale systems.

For the sake of illustration, in many video systems like those used in public transportation and for surveillance of big corporations and cities, large-scale systems of multiple cameras are used. As soon as more than approximately ten cameras are used, issues related to resource sharing arise. In particular, storage and bandwidth often create bottlenecks that are difficult to predict, since they occur infrequently. To cope with these problems, system integrators largely rely on redundancy and overcapacity to make it possible to absorb the temporary increase in resource consumption. Similarly, system integrators set the systems to cope with a mean situation, even though environment changes will occur.

Accordingly, there is a need for auto-setting video systems, in particular for auto-setting of image acquisition and processing modules and of sharing resources.

When considering large-scale video systems, for example video systems comprising hundreds of cameras, each camera having thousands of setting combinations, and multiple resources that can be shared according to thousands of combinations, the optimization of the video systems becomes very complex.

SUMMARY OF THE INVENTION

The present invention has been devised to address one or more of the foregoing concerns.

In this context, there is provided a solution for auto-setting of cameras and of sharing resources, for example in video surveillance systems.

According to a first aspect of the invention, there is provided a method of setting at least one module of a set of image acquisition and processing modules in a video system, the modules of the set of image acquisition and processing modules sharing at least one same resource, a task to perform being assigned to each module of the set of modules, the method comprising:

obtaining, for each module of the set of modules, a score function depending on:
  a value characterizing an efficiency for the considered module to perform the task to which it is assigned,
  a level of consumption of the at least one same resource by the considered module, and
  a trade-off value characterizing the importance of the efficiency of performing a task relative to resource consumption of the at least one same resource, one trade-off value being associated with each at least one same resource, determining an updated value of the trade-off value of the at least one same resource, the trade-off value of the at least one same resource being updated so that the level of consumption of the at least one same resource reaches a resource consumption threshold;

identifying settings of the at least one module of the set of modules, the identified settings optimizing a result of the score function of the at least one module when considering the updated trade-off value; and setting the at least one module according to the identified settings, wherein the score function increases when the value characterizing an efficiency for the considered module to perform the task to which it is assigned increases and the score function decreases when the level of consumption of the at least one same resource increases.

According to the method of the invention, a video system may be set automatically, at least regarding camera settings and sharing of resources, for most data processing modules such as video content analytics. It is almost instantaneous (carrying out the method of the invention is much faster than processing the images obtained from the cameras) and minimally-invasive in that very few resources are needed to carry out the method of the invention. In addition, the method of the invention is dynamic and thus, a video system may be set dynamically, for example to adapt settings as a function of the environment changes.

Optional features of the invention are further defined in the dependent appended claims.

According to a second aspect of the invention, there is provided a device for setting at least one module of a set of image acquisition and processing modules in a video system, the modules of the set of image acquisition and processing modules sharing at least one same resource, a task to perform being assigned to each module of the set of modules, the device comprising a microprocessor configured for carrying out the steps of:

obtaining, for each module of the set of modules, a score function depending on:
- a value characterizing an efficiency for the considered module to perform the task to which it is assigned,
- a level of consumption of the at least one same resource by the considered module, and
- a trade-off value characterizing the importance of the efficiency of performing a task relative to resource consumption of the at least one same resource, one trade-off value being associated with each at least one same resource, determining an updated value of the trade-off value of the at least one same resource, the trade-off value of the at least one same resource being updated so that the level of consumption of the at least one same resource reaches a resource consumption threshold;

identifying settings of the at least one module of the set of modules, the identified settings optimizing a result of the score function of the at least one module when considering the updated trade-off value; and setting the at least one module according to the identified settings, wherein the score function increases when the value characterizing an efficiency for the considered module to perform the task to which it is assigned increases and the score function decreases when the level of consumption of the at least one same resource increases.

The second aspect of the present invention has optional features and advantages similar to the first above-mentioned aspect.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which:

FIG. 13 is a table illustrating relationships between the noise and the gain in accordance with an aspect of the present disclosure.

FIG. 14 is a table illustrating relationships between the blur and the shutter speed (motion blur) and the aperture (focus blur) in accordance with an aspect of the present disclosure.

FIG. 15 is a table illustrating the relationships between the contrast and the gain, the shutter speed, and the aperture in accordance with an aspect of the present disclosure.

FIG. 16 is a table illustrating the relationships between the blur and the shutter speed (motion blur) and the aperture (focus blur) in accordance with an aspect of the present disclosure.

FIG. 17 is a table illustrating the relationships between the VCA accuracy and a number of images to be analysed by the VCA per period of time (N) and an identification score threshold (θ) to be exceeded for a face to be identified in accordance with an aspect of the present disclosure.

DETAILED DESCRIPTION OF EMBODIMENTS OF THE INVENTION

According to embodiments, a new auto-setting method is provided, making it possible to combine the auto-setting of image acquisition and processing modules of a video system with the auto-setting of sharing resources of this video system. Interdependence between the auto-setting of image acquisition and processing modules and the auto-setting of sharing resources may be established by using a parameter characterizing a trade-off between an accuracy of image acquisition and processing modules and of a level of resource consumption.

Figure 1:
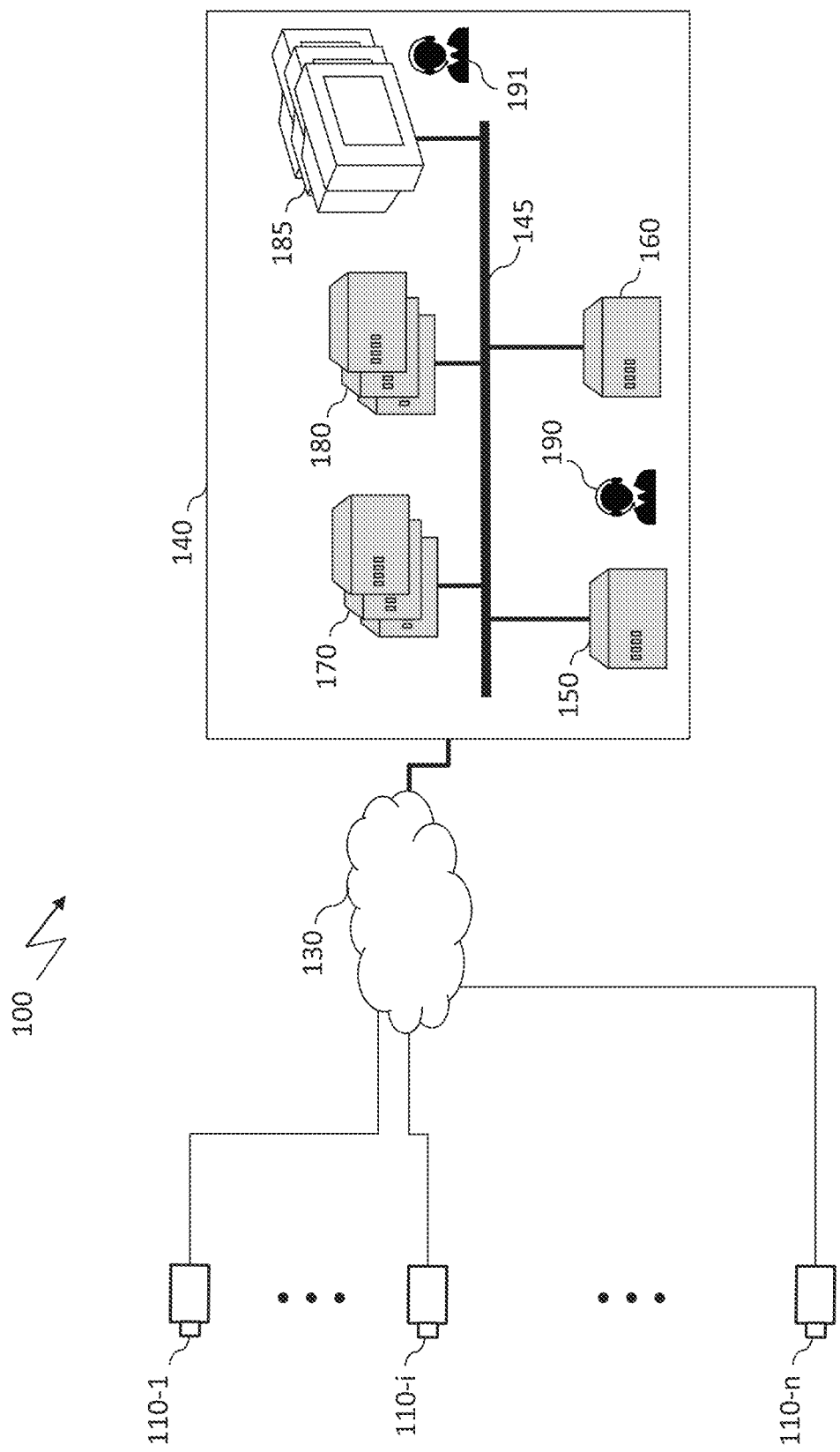
FIG. 1 schematically illustrates an example of a video surveillance system wherein embodiments of the invention may be implemented.

FIG. 1 schematically illustrates an example of a video surveillance system wherein embodiments of the invention may be implemented.

Video surveillance system 100 includes a plurality of network cameras denoted 110-1 to 110-n, for example network cameras of the Internet Protocol (IP) type, generically referred to as IP cameras 110. For the sake of illustration only three cameras are illustrated but it is to be understood that the video surveillance system may comprise several tens or thousands of cameras.

Network cameras 110, also referred to as source devices, are connected to a central site 140 via a backbone network 130. In a large video surveillance system, backbone network 130 is typically a wide area network (WAN) such as the Internet.

According to the illustrated example, central site 140 comprises a video manager system (VMS) 150 used to manage the video surveillance system, an auto-setting server 160 used to perform an automatic setting of cameras 110 and of sharing resources, a set of recording servers 170 configured to store the received video streams, a set of video content analytics (VCA) servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

According to other embodiments, the apparatuses of the central site 140 are spread over several remote sites.

The use of the recording servers of the set of recording servers 170 and the use of VCA servers of the set of VCA servers 180 may be shared to process images obtained from different cameras 110.

Video manager system 150 may be a device containing a software module that makes it possible to configure, control, and manage the video surveillance system, for example via an administration interface. Such tasks are typically carried out by an administrator (e.g. administrator 190) who is in charge of configuring the overall video surveillance system. In particular, administrator 190 may use video manager system 150 to select a source encoder configuration for each source device of the video surveillance system. In the state of the art, it is the only means to configure the source video encoders.

The set of displays 185 may be used by operators (e.g. operators 191) to watch the video streams corresponding to the scenes shot by the cameras of the video surveillance system.

The auto-setting server 160 contains a module for setting automatically or almost automatically parameters of cameras 110 and of sharing resources, for example for sharing recording servers of the set of recording servers 170 and VCA servers of the set of VCA servers 180.

It is described in more detail by reference to FIG. 2.

Administrator 190 may use the administration interface of video manager system 150 to set input parameters of the auto-setting algorithm described with reference to FIGS. 3 to 12, carried out in in auto-setting server 160.

An example of auto-setting of cameras is described by reference to FIGS. 9 to 12.

Figure 2:
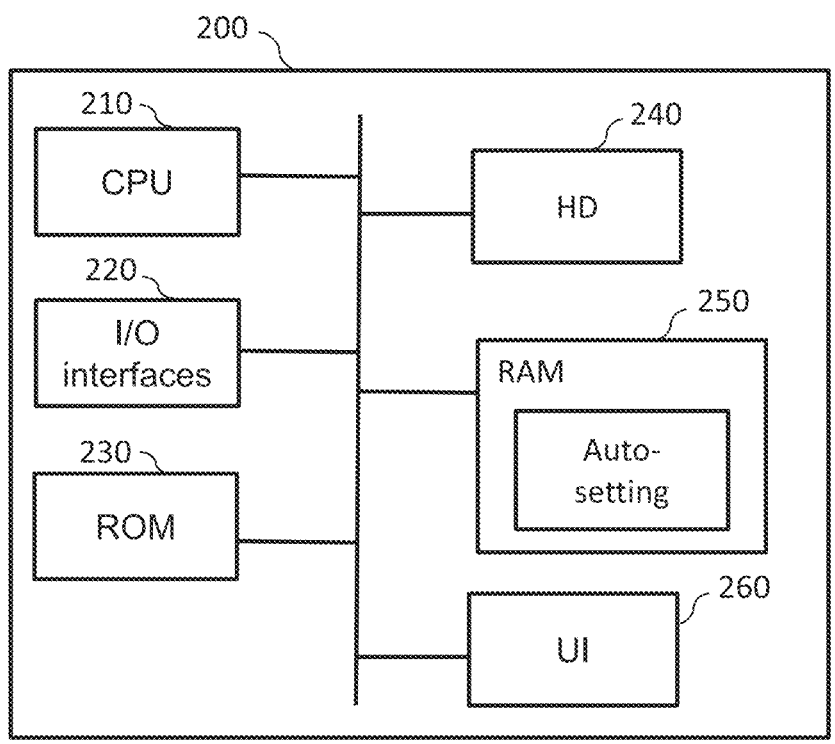
FIG. 2 is a schematic block diagram of a computing device for implementing embodiments of the invention.

FIG. 2 is a schematic block diagram of a computing device for implementing embodiments of the invention. It may be embedded in auto-setting server 160 described with reference to FIG. 1.

The computing device 200 comprises a communication bus connected to:
- a central processing unit 210, such as a microprocessor, denoted CPU;
- an I/O module 220 for receiving data from and sending data to external devices. In particular, it may be used to retrieve images from source devices;
- a read only memory 230, denoted ROM, for storing computer programs for implementing embodiments;
- a hard disk 240 denoted HD;
- a random access memory 250, denoted RAM, for storing the executable code of the method of embodiments of the invention, in particular an auto-setting algorithm, as well as registers adapted to record variables and parameters;
- a user interface 260, denoted UI, used to configure input parameters of embodiments of the invention. As mentioned above, an administration user interface may be used by an administrator of the video surveillance system.

The executable code may be stored either in random access memory 250, in hard disk 240, or in a removable digital medium (not represented) such as a disk of a memory card.

The central processing unit 210 is adapted to control and direct the execution of the instructions or portions of software code of the program or programs according to embodiments of the invention, which instructions are stored in one of the aforementioned storage means. After powering on, CPU 210 may execute instructions from main RAM memory 250 relating to a software application after those instructions have been loaded, for example, from the program ROM 230 or hard disk 240.

Figure 3:
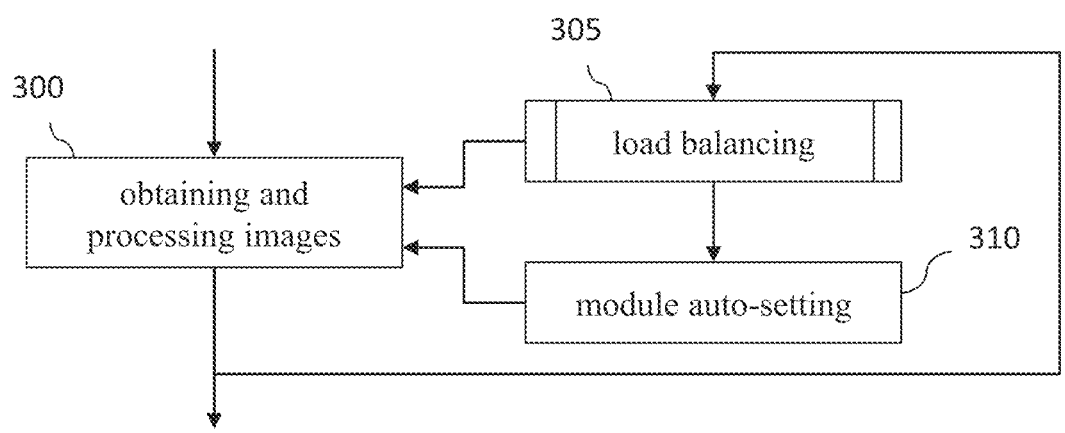
FIG. 3 is a block diagram illustrating an example of general steps according to embodiments.

FIG. 3 is a bock diagram illustrating an example of general steps according to embodiments, As illustrated, a step is directed to obtaining and processing images (step 300). The images may be obtained from cameras and processed by video content analysis modules, on a standard basis.

According to particular embodiments, settings of sharing resources are optimized dynamically, for example on a regular basis, on a user's request, or on detection of an event, during a load balancing step (step 305). During this step, a common trade-off value between the accuracy of each image acquisition and processing modules using a given resource (resource j) and the consumption of this resource by each of these modules, denoted $\beta_j(t)$, is updated to make it possible to optimize the use of this resource by all the modules that use it and to optimize the settings of the modules that use it. As described above, the settings of the module that use the considered resource are optimized as a function of the "cost" of using this resource (which is implicitly embedded within the trade-off value). This is preferably done for each available shared resource. Load balancing results from the use of each resource by each module.

For the sake of illustration, shared resources may comprise processing power (CPU), spaces of storage, and communication path bandwidth.

Settings of the image acquisition and processing modules may be predetermined and optimized dynamically during an auto-setting step (step 310), as a function of the available resources and the "cost" of using them. Again, such an optimization can be performed on a regular basis, on a user's request, or on detection of an event. Parameters of the image acquisition modules (e.g. cameras) may comprise, for example, gain, shutter, and speed; and parameters of image processing modules may comprise, for example, a number of images to be analysed per period of time (which is different from the frame rate of a video stream since not all the images of the video stream should be systematically analysed) and an identification score threshold to be exceeded for a target to be identified (i.e. if the identification score is below this threshold, the target is considered as unknown).

According to particular embodiments, auto-setting of image acquisition and processing modules is carried out by auto-setting controllers, a different auto-setting controller being associated with each image acquisition module and each image processing module. These auto-setting controllers take into account each of the resources used by the module it is associated with, giving a penalty that increases with resource consumption.

Still according to particular embodiments, a load balancing controller is associated with each resource, making it possible to optimize sharing of that resource by all the modules (image acquisition modules and image processing modules) that use it. Load balancing controllers determine a value denoted $\beta_j$ associated with each resource (and with all modules using the corresponding resource), where index j corresponds to a resource. According to particular embodiments, a load balancing controller modifies the value $\beta_j$ as a function of a level of consumption of the considered resource and of a level of availability of this resource.

Such embodiments make it possible to solve a combinatorial explosion issue relating to the number of image acquisition and processing modules, since each auto-setting controller does not need knowledge about the other auto-setting controllers, but needs only information regarding the image acquisition and processing modules directly linked to the considered one (e.g. the auto-setting controller associated with a camera needs information from a video content analysis module processing images acquired by this camera). Likewise, the load balancing controllers do not need specific information regarding the image acquisition and processing modules but only the amount of resource used. The value $\beta_j$ makes the link between these independent auto-setting controllers and these load balancing controllers. What is needed is a load balancing algorithm that automatically tunes $\beta$ values according to the resource use level.

Figure 4:
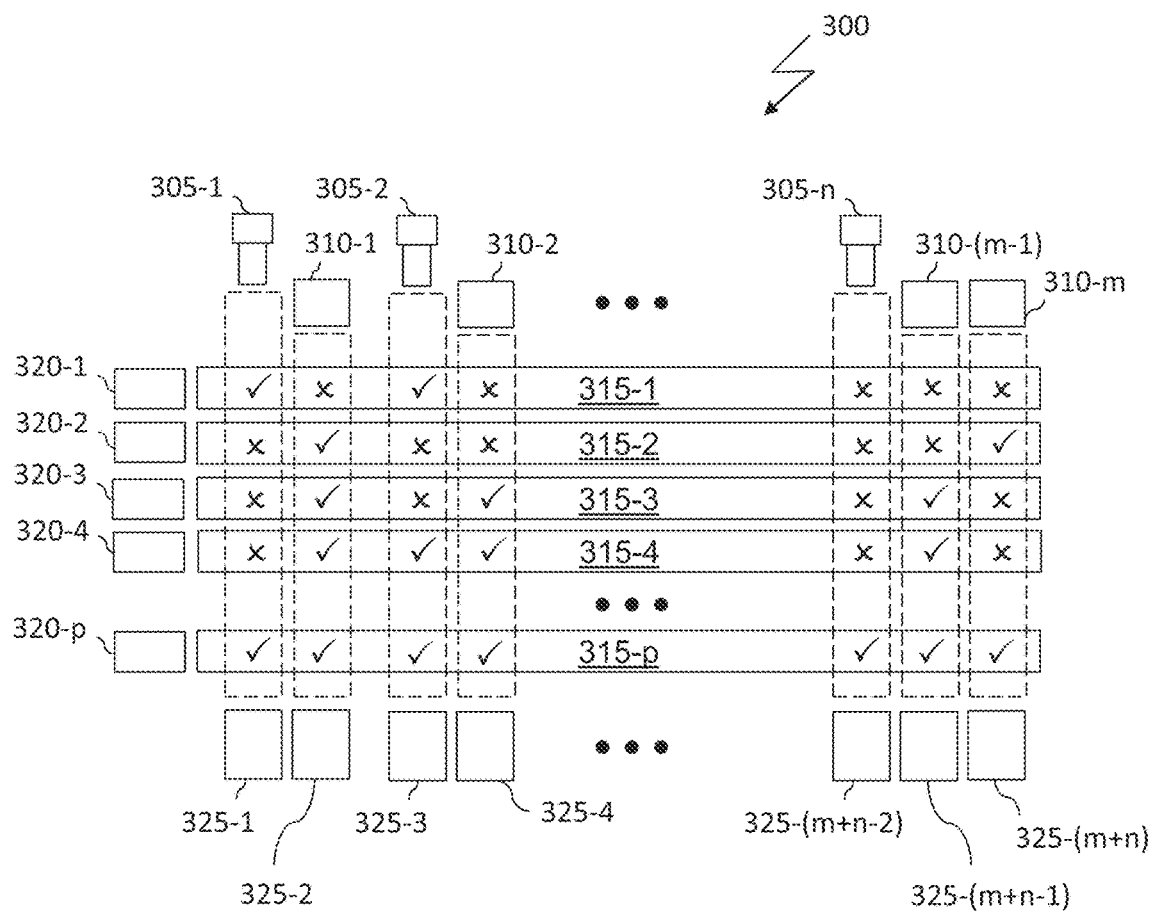
FIG. 4 is a block diagram illustrating the relations between image acquisition and processing modules, resources, auto-setting controllers, and load balancing controllers of a video system.

FIG. 4 is a block diagram illustrating the relations between image acquisition and processing modules, resources, auto-setting controllers, and load balancing controllers of a video system.

As illustrated, video system 300 comprises n cameras denoted 305-1 to 305-n and m image processing modules denoted 310-1 to 310-m, for example m VCAs. Each image processing module is configured for processing images obtained from one camera or from several cameras. Likewise, the images acquired by one camera may be processed by one or several image processing modules. For the sake of illustration, image processing modules 310-1 and 310-2 process images acquired by cameras 305-1 and 305-2, respectively, and the images acquired by camera 305-n are processed by image processing modules 310-(m-1) and 310-m.

Video system 300 further comprises p resources denoted 315-1 to 315-p. For the sake of illustration, resources 315-1 and 315-4 may be storage servers, resources 315-2 and 315-3 may be image processing servers, and resource 315-p may be a communication link.

The use of a resource by a module is illustrated with signs "✓" and "x" ("✓" means that the resource is used by the module and "x" means that the resource is not used by the module). Therefore, according to the illustrated example and as an example, camera 305-2 uses storage servers 315-1 and 315-4 as well as communication link 315-p while image processing module 310-2 uses image processing server 315-3, storage server 315-4, and communication link 315-p.

Video system 300 further comprises load balancing controllers denoted 320-1 to 320-p and auto-setting controllers denoted 325-1 to 315-(m+n). According to the illustrated example, one load balancing controller is associated with each resource and one auto-setting controller is associated with each image acquisition and processing module. For example, load balancing controller 320-3 is associated with resource 315-3 and auto-setting controller 325-4 is associated with image processing module 310-2. Other configurations can be used. In particular, one auto-setting controller may be associated with several image acquisition and/or processing modules for optimizing parameters of each of these modules.

Auto-Setting of Image Acquisition and Processing Modules

According to embodiments, all the auto-setting controllers are independent and each of them carries out steps for maximizing a local score function denoted $score_i$ that may be expressed as follows:

$$score_i(t) = f_{score_i}(\alpha_i f_{quality_i}, \{\delta_{ij}\beta_j(t)f_{resource_j}\}_i)$$

where, $f_{score_i}$ is a score function that aims at computing a score value of an image acquisition or processing module i as a function of a quality score component and of resource consumption;

$f_{quality_i}$ is a quality function that aims at computing a quality score component for an image acquisition or processing module i, such a quality score component corresponding to how likely the task of module i is to be completed as a function of current settings of subsystem i and of other variables. These other variables are variables the values of which have an effect on the performance of the considered module. For the sake of illustration, such other variables may be related to the scene or to the targets (e.g. the size of the targets, the quality of the obtained images, etc.). Depending on the type of the module (e.g. camera or VCA), the quality function may refer to a subjective quality score labelled by humans or to the accuracy of the module (e.g. the accuracy of a VCA);

$\alpha_i$ is a weighting factor corresponding to how important image acquisition or processing module i is considered. The value of this weighting factor can be set by a user;

$f_{resource_{ji}}$ is a resource consumption function that aims at computing a resource consumption score component, corresponding to how much resource j is likely to be used by image acquisition or processing module i. This value can be determined as a function of the current settings of module i and of other variables. These other variables are variables the values of which have an effect on the resource consumption of the considered module. For the sake of illustration, such other variables may comprise a number of targets and a level of noise in the images to be processed. The score value for module i depends on the resource consumption score component of each resource used by module i;

$\beta_j$ is a parameter representing a trade-off between the use of resource j and the efficiency of the modules using resource j. Accordingly, it characterizes a "cost" of using resource j to reach a particular efficiency; and $\delta_{ij}$ is a parameter representing the use of resource j by module i. For example, $\delta_{ij}=0$ if resource j is not used by module i and $\delta_{ij}=1$ if resource j is used by module i (it corresponds to symbols "✓" and "x" in FIG. 4).

The score function may be chosen according to many possibilities provided that:
- the score function increases when the quality function increases;
- the score function decreases when cost value β decreases or when the resource consumption function decreases; and
- the score function takes into consideration consumption of all resources that are used by the considered image acquisition or processing module and by other modules, for which load balancing is to be determined.

In addition, as described above, the score function advantageously takes into account a weighting factor α corresponding to how important is the considered image acquisition or processing module i as compared to the other image acquisition and processing modules.

For the sake of illustration, the score function may be defined as follows:

$$score_i(t) = \alpha_i f_{quality_i} - \sum_j \delta_{ij} \beta_j(t) f_{resource_{j/i}}$$

Figure 5:
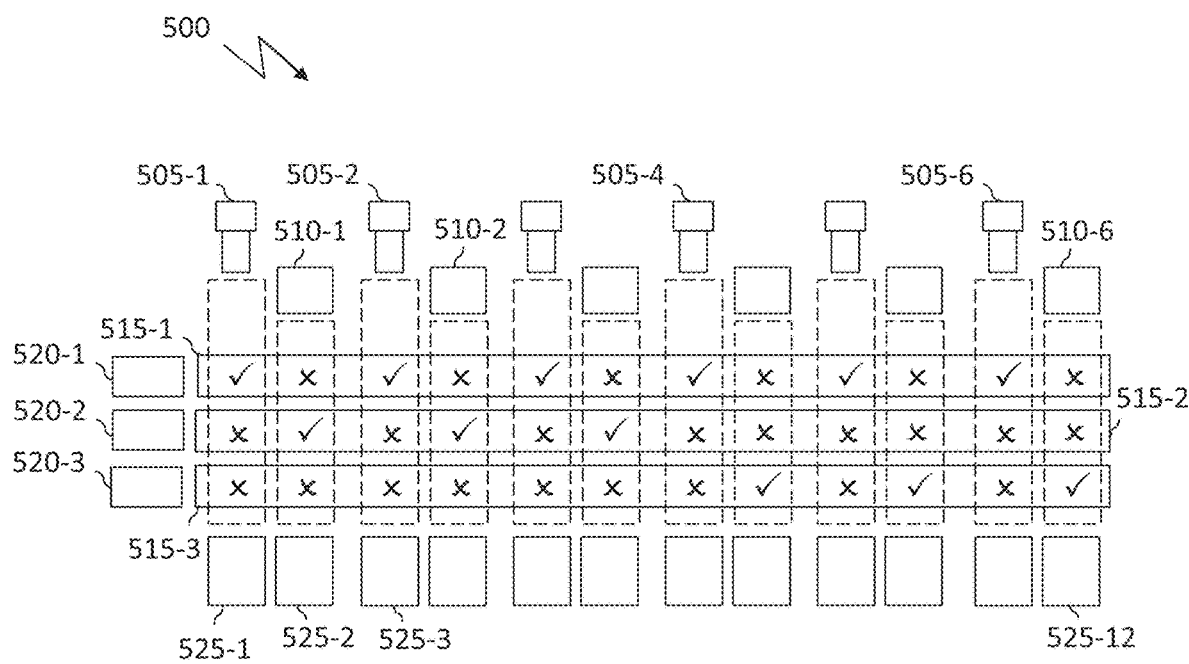
FIG. 5 illustrates an example of a video system comprising six cameras and six video content analysis modules, wherein embodiments of the invention may be carried out.

FIG. 5 illustrates an example of a video system comprising six cameras and six video content analysis modules, wherein embodiments of the invention may be carried out.

As illustrated, video system 500 comprises 6 cameras denoted 505-1 to 505-6 and 6 video content analysis modules denoted 510-1 to 510-6, each VCA being associated with one camera (e.g. VCA 510-1 is associated with camera 505-1, VCA 510-2 is associated with camera 505-2, and so on) for processing images obtained from the corresponding camera.

Video system 500 further comprises one recoding server (storage for short) denoted 515-1 and two processing servers (CPU1 and CPU2 for short) denoted 515-2 and 515-3. Recording server is used by cameras 505-1 to 505-6 for storing sequences of images, processing server 515-2 is used by VCAs 510-1 to 510-3 for processing images obtained from cameras 505-1 to 505-3, and processing server 515-3 is used by VCAs 510-4 to 510-6 for processing images obtained from cameras 505-4 to 505-6, as indicated with symbols "✓" and "x".

Video system 500 further comprises load balancing controllers denoted 520-1 to 520-3 and auto-setting controllers denoted 525-1 to 515-12 (auto-setting controller 525-1 being associated with camera 505-1, auto-setting controller 525-2 being associated with VCA 510-1, auto-setting controller 525-3 being associated with camera 505-2, and so on as illustrated).

By using the score function associated with each image acquisition or processing module, using given β values (for example β values computed load balancing controllers 520-1 to 520-3, as described hereafter), it is possible to determine which parameter values of the considered image acquisition or processing module provide the highest scores and thus, which parameter values are to be used.

According to the example illustrated in FIG. 5, the score function of camera 505-2 (cam2 for short), of camera 505-4 (cam4 for short), of VCA 510-1 (VCA1 for short), and of VCA 510-6 (VCA6 for short) may be expressed as follows, respectively:

$$score_{cam2}(t) = \alpha_{cam2} f_{quality_{cam2}} - \beta_{storage}(t) f_{resource_{storage,cam2}}$$

$$score_{cam4}(t) = \alpha_{cam4} f_{quality_{cam2}} - \beta_{storage}(t) f_{resource_{storage,cam4}}$$

$$score_{VCA1}(t) = \alpha_{VCA1} f_{VCA\_accuracy_{VCA1}} - \beta_{CPU1}(t) f_{resource_{CPU\_VCA1}}$$

$$score_{VCA6}(t) = \alpha_{VCA6} f_{VCA\_accuracy_{VCA6}} - \beta_{CPU6}(t) f_{resource_{CPU\_VCA2}}$$

where, $f_{quality_{cami}}$ is a quality function that aims at computing a quality score component for camera i, as a function of the settings of camera i;

$f_{VCA\_accuracy_{VCAi}}$ is a quality function that aims at computing a VCA accuracy score component for VCA i, as a function of the settings of VCA i;

$f_{resource_{storage\_cami}}$ is a storage consumption function that aims at computing a storage consumption score component for camera i; and $f_{resource_{CPU\_VCAi}}$ is a processing power consumption function that aims at computing a processing power consumption score component for VCA i.

By measuring the score values while modifying the camera and VCA parameters, it can be determined which parameters provide the highest score values and thus, which settings to use for the cameras and for the VCAs.

According to embodiments, a camera quality score value may be determined as a function of camera settings by obtaining (or extrapolating) a value from an array that associates a quality value for each set of predetermined values of predetermined camera parameters. For the sake of illustration, Table 4 in the Appendix associates a current score value of a camera with a triplet of values of gain (G), aperture (A), and speed (S). Such values may be obtained, for example, according to the particular embodiments described by reference to FIGS. 9, 10a, 10b, 10c, 11, and 12.

Similarly, a VCA accuracy score value may be determined as a function of VCA settings by obtaining (or extrapolating) a value from an array that associates a quality value for each set of predetermined values of predetermined VCA parameters. For the sake of illustration, while considering a VCA for face recognition, according to which relevant parameters are the number of images to be analysed by the VCA per period of time (which is different from the frame rate of a video stream since not all the images of the video stream should be systematically analysed) and an identification score threshold to be exceeded for a face to be identified (i.e. if the identification score is below this threshold, the face is considered as unknown), Table 5 in the Appendix associates a current VCA accuracy score value with a pair of values of a number of images to be analysed by the VCA per period of time (N) and an identification score threshold (θ) to be exceeded for a face to be identified.

Load Balancing of Shared Resources

According to embodiments, load balancing is performed dynamically by computing the most appropriate value of the trade-off (or cost) $\beta_j(t)$ for each shared resource j.

Figure 6:
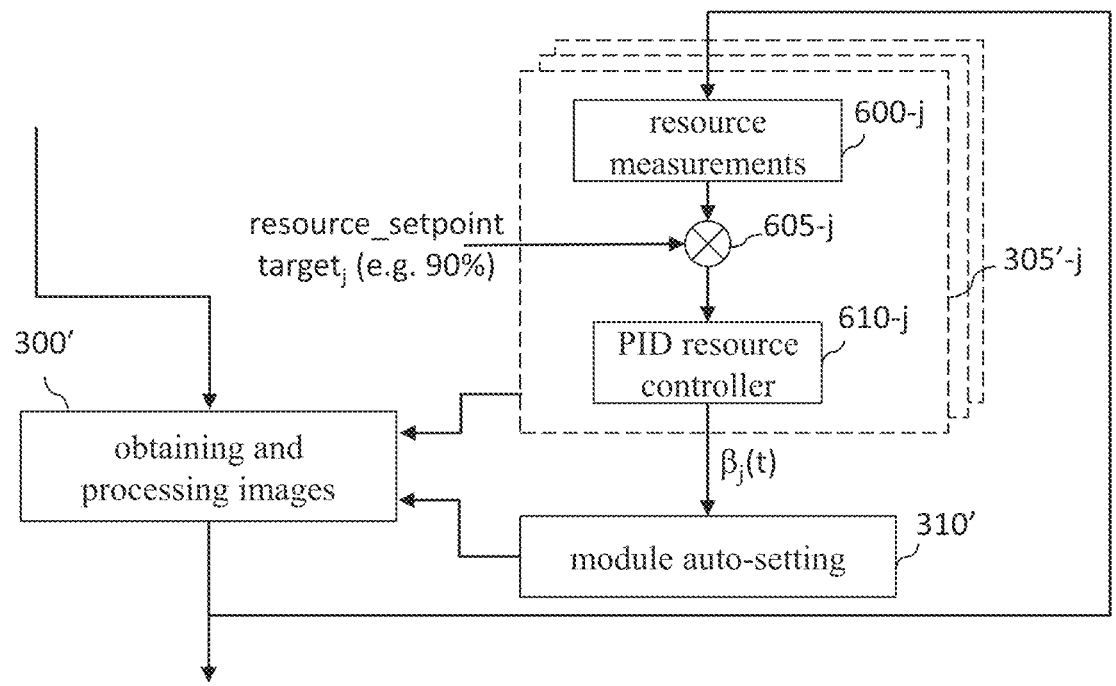
FIG. 6 illustrates a first embodiment for auto-setting of image acquisition and processing modules and of sharing resources, wherein a trade-off value $\beta_j(t)$ is estimated, for each shared resource j, using a dosed loop.

FIG. 6 illustrates a first embodiment for auto-setting of image acquisition and processing modules and of sharing resources, wherein a trade-off value $\beta_i(t)$ is estimated, for each shared resource j, using a closed loop.

As illustrated, a step is directed to obtaining and processing images (step 300'). The images may be obtained from cameras and processed by video content analysis modules, on a standard basis. This may be similar to step 300 described in FIG. 3.

In parallel, upon request of a user, on a periodical basis, or upon detection of an event, the trade-off value $\beta_i(t)$ is estimated (step 305'-j), for each shared resource j (for the sake of illustration, only the steps directed to resource j are illustrated) As illustrated, estimating the trade-off value $\beta_i(t)$ comprises measuring the actual use of shared resource j (step 600-j) and comparing the actual use of shared resource j with the target of use of shared resource j (step 605-j), denoted resource_setpoint_target$_j$. This is preferably done for each shared resource.

According to the illustrated embodiment, the error between the actual use of shared resource j and the target use of this shared resource is provided to a closed-bop controller of the PID type with appropriate parameters (step 610-j). In this example, the output of the closed-loop controller is directly the trade-off value $\beta_i(t)$, which is provided to each image acquisition and processing module sharing this shared resource.

As described above and according to embodiments, a load balancing controller is associated with each shared resource. Accordingly, a closed loop controller is used for each shared resource.

For each module using a shared resource, the resource consumption of this shared resource is modified as a result of the modification of the corresponding trade-off value $\beta(t)$, through a new optimum of the scoring function resulting in new settings of the module (step 310'). As a consequence, the error between the actual use of the considered shared resource and the target use of this shared resource decreases until the level of use of the considered resource reaches the target.

An advantage of such approach is that it works without any specific knowledge of the system. Accordingly, any unforeseen events are taken into account and the use of the resources always stabilizes around the resource consumption target, provided the closed-loop controller parameters are chosen so as to avoid instabilities.

Figure 7:
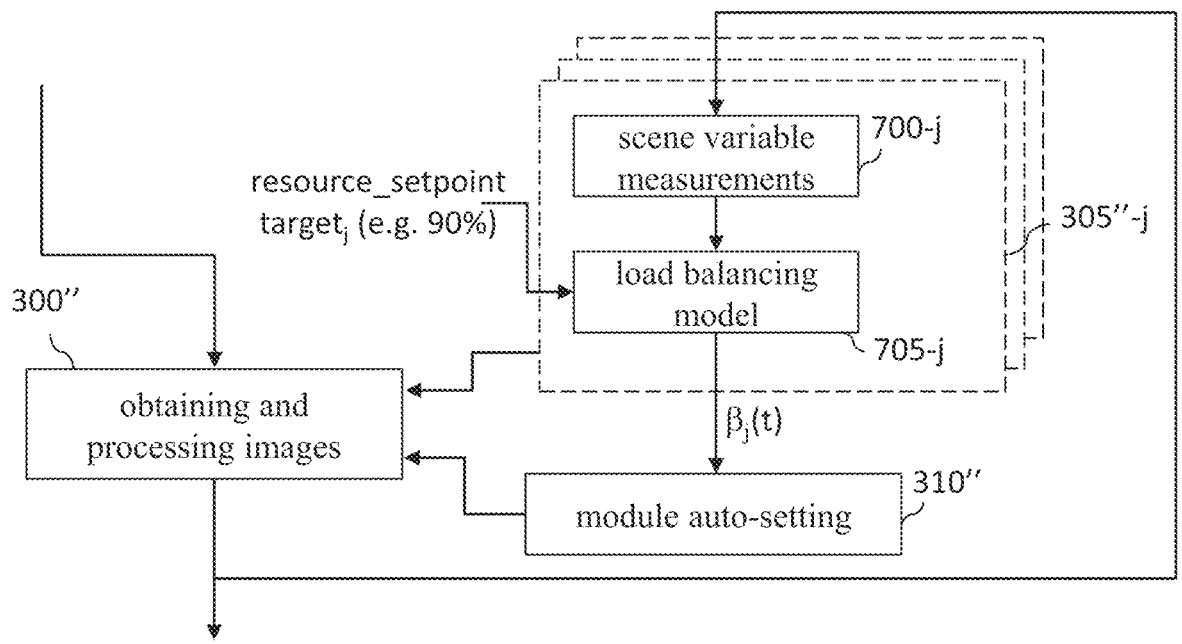
FIG. 7 illustrates a second embodiment for auto-setting of image acquisition and processing modules and of sharing resource, wherein a trade-off value $\beta_j(t)$ is estimated, for each shared resource j, using an open loop.

For the sake of illustration and considering the video system described by reference to FIG. 5, the system behaves as follows:

when the use of a shared resource j increases above a target:
the trade-off value $\beta_j(t)$ increases, which means that the "cost" of using shared resource increases and, as a consequence, the score of the modules using shared resource j decreases;
auto-setting controllers of the modules using shared resource j choose settings that use less shared resource j, resulting in decreasing the use of shared resource j;
it being noted that the higher the use above the target, the higher the trade-off value $\beta_j(t)$ and the longer the use above the target, the higher the trade-off value $\beta_j(t)$, and
when the use of shared resource j decreases below a target:
the trade-off value $\beta_j(t)$ decreases, which means that the "cost" of using shared resource j decreases and, as a consequence, the score of the modules using shared resource j increases;
auto-setting controllers of the modules using shared resource j choose settings that use more shared resource j, resulting in increasing the use of shared resource j;
it being noted that the lower the use below the target, the lower the trade-off value $\beta_j(t)$ and the longer the use below the target, the lower the trade-off value $\beta_j(t)$ FIG. 7 illustrates a second embodiment for auto-setting of image acquisition and processing modules and of sharing resource, wherein a trade-off value $\beta_j(t)$ is estimated, for each shared resource j, using an open loop.

According to this particular embodiment, a load balancing model associated with each of the shared resource is used. These load balancing models are based on the behaviour of the auto-setting controllers associated with the image acquisition and processing modules which, in turn, are based on score functions that combine quality or accuracy functions and resource consumption functions.

As illustrated, a step is directed to obtaining and processing images (step 300"). Again, the images may be obtained from cameras and processed by video content analysis modules, on a standard basis. It may be similar to step 300 described in FIG. 3.

In parallel, upon request of a user, on a periodical basis, or upon detection of an event, the trade-off value $\beta_j(t)$ is estimated (step 305"-j), for each shared resource j (for the sake of illustration, only the steps directed to resource j are illustrated). As illustrated, estimating the trade-off value $\beta_j(t)$ comprises measuring parameter values of the scene of which images are processed by the considered resource (step 700-j). Such scene parameters are variables that are needed by an open loop model to be used for estimating the trade-off value $\beta_j(t)$. They are preferably the same parameters as those of the quality or accuracy functions and of the resource consumption functions. According to embodiments, their values are measured in real-time. For the sake of illustration, the scene parameters may comprise a number of targets and a level of noise in the images to be processed.

After having obtained the values of the scene parameters to be used, the trade-off value $\beta_j(t)$ is estimated (step 705-j), for each shared resource j, by using a predetermined open loop model, specific to each of the shared resources, and a target of use of shared resource j, denoted resource_setpoint_target$_j$.

For each module using a shared resource, the resource consumption of this shared resource is modified as a result of the modification of the corresponding trade-off value $\beta(t)$, through a new optimum of the scoring function resulting in new settings of the module (step 310"). As a consequence, the error between the actual use of the considered shared resource and the target use of this shared resource decreases until the level of use of the considered resource reaches the target.

According to embodiments, the predetermined open loop models are built during a calibration phase and used during an operation phase.

During the calibration phase, a resource function (denoted resource_fcn) is determined for each of the image acquisition and processing modules. To that end, a relation between the efficiency of the module, the used recourses, and the used trade_off value $\beta_j(t)$ is estimated.

As described above, the score function associated with module i (image acquisition or processing module) may be expressed as follows:

$$\text{score}_i(t) = f_{\text{score}_i}(\alpha_i f_{\text{quality}_i}, \{\delta_{ij} \beta_j(t) f_{\text{resource}_j}\}_i)$$

The quality function and the resource consumption function are determined during the calibration of the corresponding auto-setting controller of module i. This is to be done prior to the calibration of the load balancing controller. Therefore, quality function and resource consumption function are known and both of them make it possible to determine the search value as a function of the settings of module i and of scene parameters.

Accordingly, the score function is a function (score_fcn) based, in particular, on the settings of module i (settings), on scene parameters (scene_parameters), and on the trade-off values $\beta$ (while considering all the resources used by module i):

score=score_fcn(settings, scene_variables, $\beta$)

Since the optimum settings (settings_optimum) can be determined easily, the optimum setting function (settings_optimum_fcn) can be determined:

settings_optimum=argmax$_{settings}$(score_fcn(settings, scene_variables)
settings_optimum=settings_optimum_fcn($\beta$, scene_variables, $\beta$)

Then, a resource function establishing a relation between the resources to the trade-off values $\beta$ and the scene parameters may be obtained:

resource=cste*$f_{resource}$(settings, scene_variables)

resource_optimum=cste*$f_{resource}$(settings_optimum, scene_variables)

resource_optimum=resource_fcn($\beta$, scene_variables)

Using the resource functions determined for each of the image acquisition and processing modules, a global resource function (H) can be determined:

$$\text{resource\_global} = \sum_i \text{resource\_fcn}_i(\beta, \text{scene\_variables}_i)$$

$$\text{resource\_global} = H(\beta, \{\text{scene\_variables}_i\})$$

The beta function giving the optimal trade-off values $\beta$ for the shared resources, as a function of the objective global resource resource_global and the actual scene parameter values (scene_variable$_i$) may then be computed as the inverse of resource_global:

$\beta$=beta_fcn(resource_global, {scene_var$_i$})=$H^{-1}$

It can be used during the operation phase to determine the trade-off values $\beta$.

Since such function is not an analytic function, it may be difficult to obtain the inverse function. However, this can be done by sampling the possible trade-off values $\beta$ and the possible scene parameter values (scene_variable$_i$) on the whole manifold in order to calculate many resource_global values. The beta function may be obtained by a simple interpolation between these samples or by using some more sophisticated machine learning approach to calculate the trade-off values $\beta$ as a function of these inputs.

Using a dosed-loop or an open-loop for computing the trade-off values $\beta$ may depend on the image acquisition and processing modules, on their dynamics, and on how easy it is to obtain a model.

Closed-loop has the advantage of not requiring a model. In particular, it is completely independent from the auto-setting process of the image acquisition and processing modules. However, there is some inertia to reach stability. This may create some lag that is not compatible with time reaction of the order of the second. This means that the dosed-loop cannot be used for VCA auto-setting and is not adapted to auto-setting of cameras subject to quick-changing conditions.

On the other hand, open loop is very fast and does not have lag. It is very reactive to any change in conditions. However, since it is model-based, the models need to be accurate for good performance. As described above, the models have two parts: an auto-setting model (based on the quality or accuracy function and on the resource consumption function) and global resource model. If the global resource model is not correct, the load balancing may be in trouble to reach optimum settings.

According to particular embodiments, both dosed loop and open loop mechanisms are combined in an hybrid approach making it possible to combine the advantages of both mechanisms.

Figure 8:
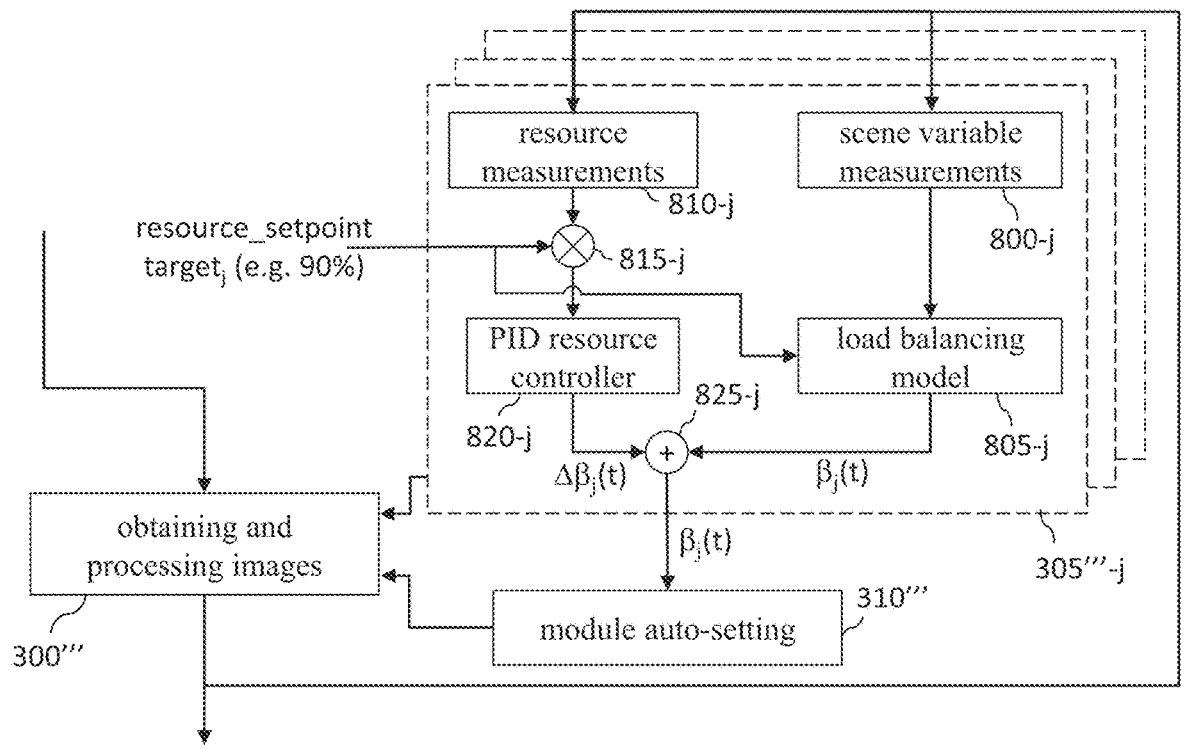
FIG. 8 illustrates a third embodiment for auto-setting of image acquisition and processing modules and of sharing resource, wherein a trade-off value $\beta_j(t)$ is estimated, for each shared resource j, using an hybrid mechanism combining a dosed loop and an open loop.

FIG. 8 illustrates a third embodiment for auto-setting of image acquisition and processing modules and of sharing resource, wherein a trade-off value $\beta_j(t)$ is estimated, for each shared resource j, using an hybrid mechanism combining a dosed loop and an open loop.

According to this particular embodiment, the controller output is the combination, for example the sum, of the output of the open-loop model providing a trade-off value $\beta_j(t)$ and of the output of the closed-loop model providing a correction value $\Delta\beta_j(t)$.

As illustrated, a step is directed to obtaining and processing images (step 300'''). Again, the images may be obtained from cameras and processed by video content analysis modules, on a standard basis. It may be similar to step 300 described in FIG. 3.

In parallel, upon request of a user, on a periodical basis, or upon detection of an event, the trade-off value $\beta_j(t)$ is estimated (step 305'''-j), for each shared resource j (for the sake of illustration, only the steps directed to resource j are illustrated). As illustrated, estimating the trade-off value $\beta_j(t)$ comprises measuring parameter values of the scene of which images are processed by the considered resource (step 800-j). Such scene parameters are variables that are needed by an open loop model to be used for estimating the trade-off value $\beta_j(t)$. As described above, they are preferably the same parameters as those of the quality or accuracy functions and of the resource consumption functions. According to embodiments, their values are measured in real-time. Still for the sake of illustration, the scene parameters may comprise a number of targets and a level of noise in the images to be processed.

After having obtained the values of the scene parameters to be used, the trade-off value $\beta_j(t)$ is estimated (step 805-j), for each shared resource j, by using a predetermined open loop model, specific to each of the shared resources, and a target of use of shared resource j, denoted resource_setpoint_target$_j$.

As described above, the predetermined open loop models may be built during a calibration phase and used during an operation phase.

While measuring scene variable values, before or after, the actual use of shared resource j are measured (step 810-j) and compared with the target of use of shared resource j (step 815-j), denoted resource_setpoint_target$_j$. This is preferably done for each shared resource.

According to the illustrated embodiment, the error between the actual use of shared resource j and the target use of this shared resource is provided to a closed-loop controller of the RDI type with appropriate parameters (step 820-j).

In this example, the output of the closed-loop controller is an error of the trade-off value $\beta_j(t)$, denoted $\Delta\beta_j(t)$.

Next, the output of the open-loop model providing a trade-off value $\beta_j(t)$ (references 800-j to 805-j) is combined with, for example added to, the output of the closed-loop model providing a correction value $\Delta\beta_j(t)$ (references 810-j to 820-j).

As illustrated, the resulting trade-off value $\beta_j(t)$ is provided to each image acquisition and processing module sharing shared resource j.

For each module using a shared resource, the resource consumption of this shared resource is modified as a result of the modification of the corresponding trade-off value $\beta(t)$, through a new optimum of the scoring function resulting in new settings of the module (step 310'''). As a consequence, the error between the actual use of the considered shared resource and the target use of this shared resource decreases until the level of use of the considered resource reaches the target The particular embodiments described by reference to FIG. 8 provide an efficient way of estimating the trade-off value $\beta(t)$, in terms of response time and in terms of accuracy, since the errors related to the open loop model are corrected by the dosed loop stage.

The reason why such an hybrid approach is efficient is due to the fact that the closed loop part is only used on the error between model resource consumption and real resource consumption. In many cases, the errors of the open loop model are due to the scene specifics themselves; they are therefore not random errors, but rather systematic errors that are like a bias, which is substantially constant over small time intervals. For this reason, even though the dosed loop part has some inertia, this inertia will affect only the quick changes that would occur in the error between model and reality. Since the error value is much smaller than the resource value, and much more constant, the dosed loop stage will have a much reduced inertia, Most of the quick changes required when environment changes are implemented through the open loop itself, the dosed loop part having much less to do.

Figure 9:
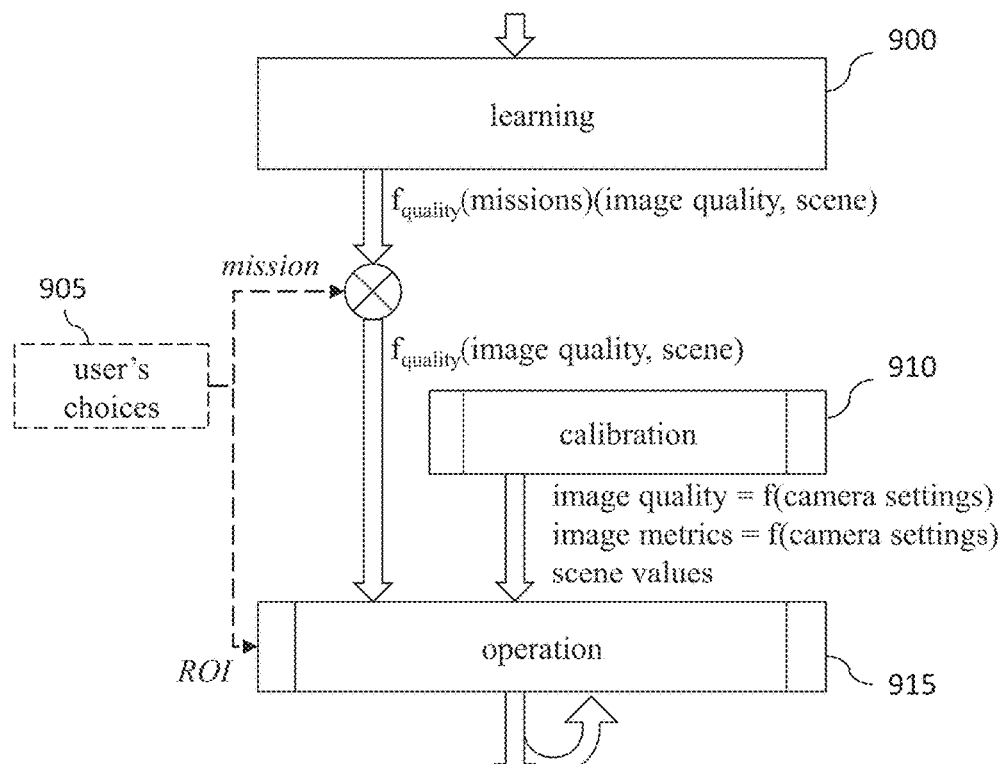
FIG. 9 is a block diagram illustrating an example of an auto-setting method making it possible to set automatically parameters of a source device, typically a camera.

Determining Camera Score Values as a Function of Camera Parameters and Auto-Setting of Cameras FIG. 9 is a block diagram illustrating an example of an auto-setting method making it possible to set automatically parameters of a source device, typically a camera.

As illustrated, a first phase is a learning phase (reference 900). According to embodiments, it is performed before the installation of the considered camera, for example during the development of a software application for processing images. Preferably, the learning phase is not specific to a type of camera (i.e. it is advantageously generic). During this phase, a relation or a function is established between a quality value (relating to the result of the image processing) and all or most of the relevant variables that are needed to estimate such a processing result quality. These relevant variables may include image quality-dependent parameters and/or scene-dependent parameters. As described hereafter, this relation or function, denoted quality function, may depend on a type of the missions that can be handled by any camera.

An objective of the learning phase is to obtain a quality function which is able to state prima facie the quality of an image in the context of a particular mission, as a function of parameters which have an impact on the mission.

According to particular embodiments, the output of the learning phase is a quality function that may be expressed as follows:

$$f_{quality}(\text{missions})(\text{image quality, scene})$$

where, missions is a type of mission;

image quality is a set of parameters that may comprise a bur value, a noise value, and a contrast value; and scene is a set of parameters that may comprise a target size, a target velocity, and/or a target distance.

Therefore, in particular embodiments, the output of the learning phase may be expressed as follows:

$$f_{quality}(\text{missions})(\text{noise, blur; contrast, target\_size, target\_velocity, target\_distance})$$

The quality function $f_{quality}$ may be a mathematical relation or an n-dimensional array associating a quality value with a set of n parameter values, e.g. values of noise, blur, contrast, target size, target velocity, and target distance.

As denoted with reference 905, the type of mission to be handled by the camera may be chosen by a user (or an installer) during installation of the camera or later on. Likewise, a user may select a region of interest (ROI) corresponding to a portion of an image to be processed. As illustrated with the use of dotted lines, this step is optional.

As illustrated, after a user has selected a type of mission, the quality function obtained from the learning phase may be written as follows:

$$f_{quality}(\text{image quality, scene})$$

or, according to the given example:

$$f_{quality}(\text{noise, blur, contrast, target\_size, target\_velocity, target\_distance})$$

Alternatively, the auto-setting algorithm may be configured for a particular type of mission and the whole captured scene may be considered.

It is observed here that there exist two sources of blur, the motion blur and the focus blur.

A second phase (reference 910) is directed to calibration. This is typically carried out during installation of the camera and aims at measuring scene values from the actual scene according to the settings of the camera, as well as at obtaining parameter values depending on the camera settings. This may take from a few minutes to a few tens of minutes. As explained hereafter, in particular with reference to FIGS. 10a, it makes it possible to determine quality processing values according to the actual scene and the current camera settings. According to particular embodiments, the calibration phase is run only once.

The outputs of this phase may comprise: scene values (for example target size, target velocity, and target distance); image quality values (for example noise, blur, and contrast) that may be determined as a function of the camera settings (for example gain, shutter speed, and aperture); and image metrics (for example luminance) that may be determined as a function of the camera settings (for example gain, shutter speed, and aperture). They can be expressed as follows:

scene-related parameters:

target_size target_speed target_distance image quality:

$$\text{noise} = f_{noise\_calibration}(\text{gain, shutter\_speed, aperture})$$

$$\text{blur} = f_{blur\_calibration}(\text{gain, shutter\_speed, aperture})$$

$$\text{contrast} = f_{contrast\_calibration}(\text{gain, shutter\_speed, aperture})$$

image metrics:

$$\text{luminance} = f_{luminance\_calibration}(\text{gain, shutter\_speed, aperture})$$

The functions ($f_{noise\_calibration}$, $f_{blur\_calibration}$, $f_{contrast\_calibration}$, $f_{luminance}$_calibration) may be mathematical relations or 3-dimensional arrays associating values with sets of 3 parameter values (gain, shutter speed, and aperture). Alternatively, the functions ($f_{noise\_calibration}$, $f_{blur\_calibration}$, $f_{contrast\_calibration}$, $f_{luminance\_calibration}$) may be mathematical relations or 3-dimensional arrays associating values with sets of 2 parameter values (gain and shutter speed).

A third phase (reference 915) is directed to operation. It is performed during the operational use of the camera to improve its settings. It is preferably executed in a very short period of time, for example less than one second, and without perturbation for the camera, except for changing camera settings (i.e. it is a non-invasive phase). It is used to select suitable camera settings, preferably the most suitable camera settings.

To that end, data obtained during the calibration phase are used to calculate good settings, preferably the best settings, according to the quality function determined during the learning phase, in view of the current environmental conditions. Indeed, the environmental conditions, typically lighting, may be different from the environmental conditions corresponding to the calibration. Accordingly, the calibration data must be adjusted to fit the current environmental conditions. Next, the adjusted data are used to calculate the best settings. This may be an iterative process since the adjustments of the calibration data are more accurate when camera settings get closer to the optimal settings. Such an operation phase is preferably carried out each time a new change of camera settings is needed.

The output of the operation phase is a camera setting, for example a set of gain, shutter speed, and aperture values.

During the operation phase a test may be performed to determine whether or not the items of information determined during the calibration phase make it possible to obtain accurate results.

Learning Phase

Video surveillance cameras can be used in quite different contexts that is to say to conduct different "missions" or "tasks". For example, some cameras may be used to provide an overall view, making it possible to analyse wide areas, for example for crowd management or detection of intruders, while others may be used to provide detailed views, making it possible, for example to recognize faces or license plates and others may be used to control the proper functioning of machinery, for example in factories. Depending on the type of mission, the constraints associated with the camera may be quite different. In particular, the impact of the noise, blur, and/or contrast is not the same depending on the mission. For example, the bur has generally a high impact on missions for which details are of importance, e.g. for face or license plate readability. In other cases, the noise may have more impact, for example when scenes are monitored continuously by humans (due to the higher eye strain experienced on noisy videos).

As set forth above, an objective of the learning phase is to get a quality function which is able to state prima fade the quality of an image in the context of a particular type of missions, as a function of parameters which have an impact on the missions.

According to embodiments such parameters may be the followings:
- the parameters which represent a quality of images provided by the camera, which depend on the camera settings. Such parameters may comprise the noise, the blur, and/or the contrast; and
- the parameters that are directed to the scene and the mission to be performed, referred to as scene-dependent parameters hereafter, their values being referred to as scene values. Their number and their nature depend on the type of missions. These parameters may comprise a size of targets, and/or a velocity of the targets, and/or a distance of the targets from the camera. The values of these parameters may be predetermined, may be determined by a user, or may be estimated, for example by image analysis. They do not have a direct impact on the image quality but play a role in how difficult it is to fulfil a mission, For example, the noise has more impact on smaller targets than on larger targets so the perceived quality of noisy images will be worse when targets are smaller.

Regarding the image quality, it has been observed that the noise, the blur, and the contrast are generally the most relevant parameters. Nevertheless, camera settings have an impact on other parameters that may be considered as representative of the image quality, for example on the depth-of-field and/or on or the white balance. However, it is observed that for particular applications, due to hyperfocal settings in video surveillance systems, the depth of field may be not very relevant. It is also to be noted that the white balance is generally efficiently handled by the camera auto-mode. Accordingly and for the sake of clarity, the following description is based on the noise, the blur, and the contrast as image quality parameters. However, it must be understood that other parameters may be used.

Regarding the scene-dependent parameters, it has been observed that the target size, the target velocity, and the target distance are generally the most relevant parameters. Therefore, for the sake of clarity, although other parameters may be used, the following description is based on these three parameters.

Accordingly, the quality function determined in the learning phase may generally be expressed as follows:

$$f_{quality}(\text{missions})(\text{noise, blur, contrast, target\_size, target\_velocity, target\_distance})$$

or as a set of functions (one function per type of mission denoted mission<i>):

$$f_{quality}(\text{noise, blur, contrast, target\_size, target\_velocity, targret\_distance}) \text{ for mission<i>}$$

or as a function corresponding to a predetermined type of mission for which a video surveillance system is to be used:

$$f_{quality}(\text{noise, blur, contrast, target\_size, target\_velocity, target\_distance})$$

Such a function makes it possible, during the operation phase, to select efficient camera settings for the mission to be carried out, in view of the noise, blur, contrast, target velocity, and target size corresponding to the current camera settings (according to the results obtained during the calibration phase).

For the sake of illustration, this function may be scaled between 0 (very low quality) and 1 (very high quality).

According to embodiments, the quality function is set by an expert who determines how to penalize the noise, blur, and contrast for a considered type of mission, For the sake of illustration, the quality function may be the following:

$$f_{quality} = 3 \frac{V_{noise} \times V_{blur} \times V_{contrast}}{V_{noise} + V_{blur} + V_{contrast}}$$

where $V_{noise}$, $V_{blur}$, and $V_{contrast}$ represent values for the noise, blur, and contrast parameters, respectively.

As described above, the blur comprises a motion blur component and a focus blur component. Therefore, the blur may be expressed as follows:

$$blur = blur_A + blur_S$$

where $blur_A$ represents the value of the focus blur and $blur_S$ represents the value of the motion blur.

The quality function $f_{quality}$ makes it possible to determine a quality value as a function of general image characteristics such as the noise, blur, and contrast, and of scene characteristics such as target size, for a particular mission. However, this function cannot be used directly since it is not possible to determine a priori the noise, blur, and contrast since these parameters cannot be set on a camera.

Calibration Phase

The objective of the calibration phase is to measure in-situ, on the actual camera and the actual scene, all the data that are required to calculate a quality value from an $f_{quality}$ function as determined during the learning phase.

Accordingly, the calibration phase comprises four objectives (or only three if the focus is not to be set):
- determining or measuring the scene-dependent parameters, for example a target size, a target velocity, and a target distance;
- setting a focus;
- estimating functions to establish a link between each of the image quality parameters (for example the noise, blur, and contrast) and the camera settings (for example the gain (G), the shutter speed (6), and the aperture (A)) as follows:

noise=$f_{noise\_calibration}$(G, S, A), in short noise$_{cal}$(G,S, A)

blur=$f_{blur\_calibration}$(G, S, A), in short blur$_{cal}$(G,S, A)

contrast=$f_{contrast\_calibration}$(G, S, A), in short contrast$_{cal}$(G,S, A)

estimating a function to establish a link between an image metric (for example the luminance) and the camera settings (for example the gain (G), the shutter speed (S), and the aperture (A)). According to embodiments, luminance is used during the operation phase to infer new calibration functions when scene lighting is modified. R may be expressed as follows:

luminance=$f_{luminance\_calibration}$(G, S, A), in short $t_{cal}$ (G, S, A)

Figures 10A, 10B:
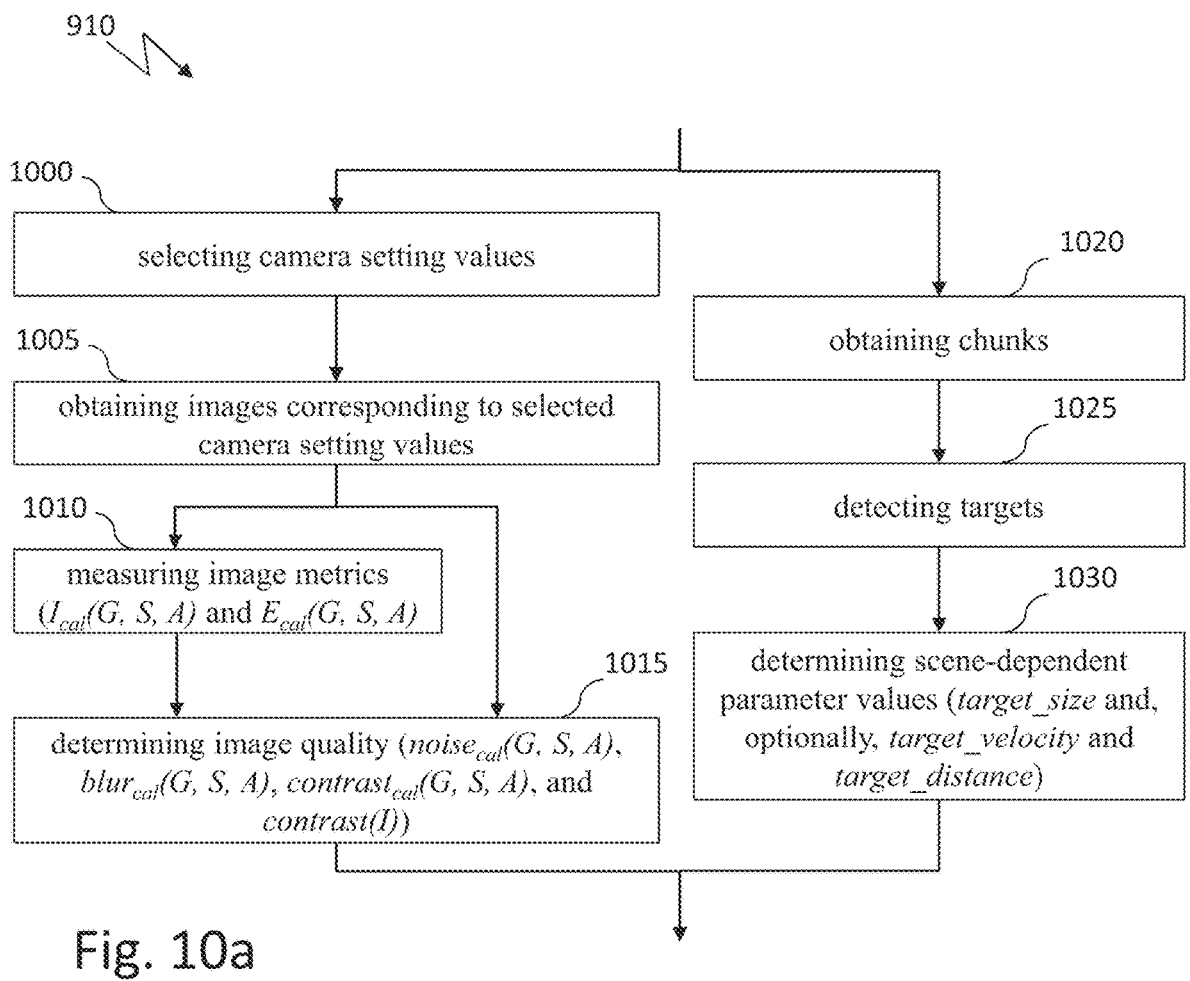
FIG. 10a is a block diagram illustrating an example of steps carried out during a calibration phase of an auto-setting method as illustrated in FIG. 9.
FIG. 10b is a block diagram illustrating an example of steps carried out for building a distance map of moving targets from a region of interest (ROI) a focus value (F), and images.

FIG. 10a is a block diagram illustrating an example of steps carried out during a calibration phase of an auto-setting method as illustrated in FIG. 9.

As illustrated, a first step (step 1000) is directed to selecting camera settings. According to particular embodiments, this step comprises exploring the manifold of all camera setting values, for example all triplets of gain, shutter speed, and aperture values, and selecting a set of representative triplets in order to reduce the number of camera settings to analyse.

According to other embodiments, this step comprises exploring the manifold of all pairs of gain and shutter speed values, and selecting a set of representative pairs in order to reduce the number of camera settings to analyse.

For the sake of illustration, the shutter speed values to be used may be selected as follows:

$$S_0 = \min(S) \text{ and } S_{i+1} = S_i \times 2$$

with index i varying from 0 to n so that $S_n \leq \max(S)$ and $S_{n+1} > \max(S)$ and where $\min(S)$ is the smallest shutter speed and $\max(S)$ is the highest shutter speed.

If shutter speeds the camera may accept are discrete values, the shutter speeds are selected so that theft values are the closest to the ones selected according to the previous relation (corresponding to a logarithmic scale).

Similarly, the gain values to be used may be selected according to a uniform linear scale as follows:

$$G_0 = \min(G) \text{ and}$$

$G_{i+1}$ is determined such that $$\frac{I(G_{i+1})}{I(G_i)} \approx \frac{I(S_{i+1})}{I(S_i)}$$

with index i varying from 0 to n such that $G_n \leq \max(G)$ and $G_{n+1} > \max(G)$ and where i is the luminance of the image, $\min(G)$ is the smallest gain, and $\max(G)$ is the higher gain.

Likewise, the aperture values to be used may be selected according to a uniform linear scale, like the gain values, as follows:

$$A_0 = \min(A) \text{ and}$$

$A_{i+1}$ is determined such that $$\frac{I(A_{i+1})}{I(A_i)} \approx \frac{I(S_{i+1})}{I(S_i)}$$

As a consequence, the gain, shutter speed, and aperture values have an equivalent scale in terms of impact on the luminance. In other words, if luminance of the image is increased by a value Δ when shutter speed value or aperture value goes from one value to the next, gain value is selected such that the luminance is also increased by the value Δ when moving from the current gain value to the next one.

After having selected a set of gain, shutter speed, and aperture values at step 1000, images are obtained from the camera set to these values (step 1005). For the sake of illustration, three to ten images may be obtained, preferably during a short period of time, for each triplet (G, S, A) of gain, shutter speed, and aperture values.

In order to optimize the time for obtaining these images and the stability of the camera during acquisition of the images, the change of camera settings is preferably minimized, i.e. the settings of the camera are preferably changed from one gain, shutter speed, and/or aperture value to the next ones (since it takes a longer time for a camera to proceed to large changes in gain, shutter speed, and aperture).

Therefore, according to embodiments, images are obtained as follows for each of the selected gain and shutter speed values:

the aperture is set to its minimum value (min(A));
the gain is set to its minimum value (min(G)) and all the selected values of the shutter speed are set one after the other according to their ascending order (from min(S) to max(S)), a number of three to ten images being obtained for each triplet of values (G, S, A);
the value of the gain is set to the next selected one and all the selected values of the shutter speed are set one after the other according to their descending order (from max(S) to min(S)), a number of three to ten images being obtained for each pair of values (G, S, A);
the previous step is repeated with the next values of the gain until images have been obtained for all selected values of the gain and shutter speed: and
the three previous steps are repeated with the next values of the aperture until images have been obtained for all selected values of the gain, shutter speed, and aperture.

Next, after having obtained images for all the selected values of the gain, shutter speed, and aperture, an image metric is measured for all the obtained images (step 1010), here the luminance, and an image quality analysis is performed for each of these images (step 1015).

The measurement of the luminance aims at determining a relation between the luminance of an image and the camera settings used when obtaining this image, for example a gain, a shutter, and an aperture values. For each obtained image, the luminance is computed and associated with the corresponding gain, shutter speed, and aperture values so as to determine the corresponding function or to build a 3-dimensional array wherein a luminance is associated with a triplet of gain, shutter speed, and aperture values (denoted $I_{cal}(G, S, A)$). According to embodiments, the luminance corresponds to the mean of pixel values (i.e. intensity values) for each pixel of the image.

According to embodiments, the entropy of the images is also computed during measurement of the luminance for making it possible to determine a contrast value during the image quality analysis. Like the luminance, the entropy is computed for each of the obtained images and associated with the corresponding gain, shutter speed, and aperture values so as to determine the corresponding function or to build a 3-dimensional array wherein an entropy is associated with a triplet of gain, shutter speed, and aperture values (denoted $E_{cal}(G, S, A)$). According to embodiments, measurement of the entropy comprises the steps of:

determining the histogram of the image pixel values, for each channel (i.e. for each component), that is to say counting the number of pixels $c_i$ for each possible pixel value (for example for i varying from 0 to 255 if each component is coded with 8 bits); and
computing the Shannon entropy according to the following relation:

$$E = -\sum_{i=0}^{255} \frac{c_i}{n} \log_2\left(\frac{c_i}{n}\right),$$

with n is the total number of pixels in all channels.

As described hereafter, the entropy may be determined as a function of the luminance (and not of the camera settings, e.g. gain, shutter speed, and aperture). Such a relationship between the entropy and the luminance can be considered as valid for any environmental conditions (and not only the environmental conditions associated with the calibration). Therefore, after having computed an entropy and a luminance for each of the obtained images, the entropy values are associated with the corresponding luminance values so as to determine the corresponding function or to build a 1-dimensional array wherein entropy is associated with luminance (denoted E(i)).

Turning back to FIG. 10*a* and as described above, the image quality analysis (step 1015) aims at determining image quality parameter values, for example values of noise, blur, and contrast from the images obtained at step 1005, in order to establish a relationship between each of these parameters and the camera settings used for obtaining the corresponding images. During this step, a relationship between the contrast and the luminance is also established.

Noise values are measured for the obtained images and the measured values are associated with the corresponding gain, shutter speed, and aperture values so as to determine the corresponding function or to build a 3-dimensional array wherein a noise value is associated with a triplet of gain, shutter speed, and aperture values ($noise_{cal}(S, A)$).

According to an embodiment, the noise of an image is determined as a function of a set of several images (obtained in a short period of time) corresponding to the same camera settings and as a result of the following steps:

removing the motion pixels, i.e. the pixels corresponding to objects in motion or in other words, removing the foreground;
computing a temporal variance for each pixel (i.e., the variance of the fluctuation of each pixel value over time, for each channel); and
computing a global noise value for the set of images as the mean value of the computed variances between all pixels and all channels.

The obtained values make it possible to establish a relationship between the noise and the camera settings.

Likewise, blur values are computed for the obtained images so as to establish a relationship between the blur and the camera settings. Each blur value corresponds to the addition of a motion blur value and a focus blur value.

According to embodiments, a motion blur value is determined as a function of a target velocity and of a shutter speed according to the following relation:

$$blur_S = \|\vec{v}_{target}\| * \text{shutter\_speed}$$

where $\vec{v}_{target}$ is the target velocity, the motion bur value being given in pixels, the target velocity being given in pixels/second, and the shutter speed being given in seconds.

Therefore, in view of the environmental conditions associated with the calibration phase (denoted "calibration environmental conditions"), the motion blur may be determined as follows:

$$blur_{S,cal}(S) = \|\vec{v}_{target}\| * S$$

The target velocity may be predetermined, set by a user, or measured from a sequence of images as described hereafter.

The focus blur may be determined according to different solutions,

According to particular embodiments, the solution to be used is determined as a function of whether or not targets of interest are moving. This can be set by a user or determined by image analysis.

If the targets of interest are moving, they are detected on obtained images, typically by using a standard image processing algorithm, and their size is determined by using knowledge on the target such as their real size and camera optical settings. Indeed, it is observed that targets generally belong to specific classes (for example humans, cars, bikes, trucks, etc.) and thus, they can be recognized and analyzed as a function of statistical information, for example to determine theft size.

This makes it possible to compute the distance of the targets to the camera and to build a distance map within a considered region of interest. A distance map typically represents the distribution of target distances for locations of the considered region of interest or a distance value for locations of the considered region of interest that can be expressed as follows distance=$f_{distance}(x, y)$ with x and y being the pixel coordinates, i.e. the row and column indices of each pixel. FIG. 10b illustrates an example of steps carried out for building a distance map of moving targets.

Figure 10C:
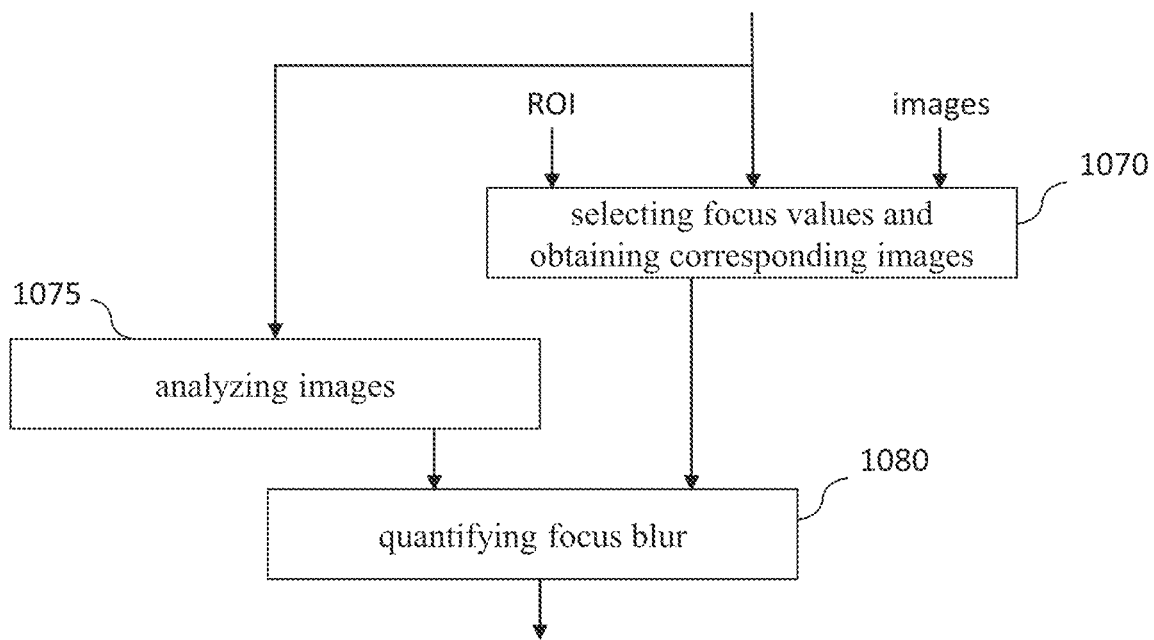
FIG. 10c is a block diagram illustrating an example of steps carded out for building a focus map of stationary targets from a region of interest and images.

On the contrary, if the targets (or at least a part of the targets) are stationary, the whole range of the focus may be explored while recording images for the different focus values that are used. The obtained images are analyzed and for locations of the considered region of interest, the focus leading to the sharpest images is determined so as to construct a focus map for the considered region of interest. A focus map typically represents the distribution of focus to be used for locations of the considered region of interest or a focus value to be used for locations of the considered region of interest that can be expressed as follows focus=$f_{focus}(x, y)$. FIG. 10c illustrates an example of steps carried out for building a distance map of moving targets.

Next, the distance map or the focus map, depending on whether or not targets are moving, is used to compute an optical aperture and focus blur as a function of aperture values, based on geometric optics calculation.

It is observed that the function establishing a relation between target distances and locations within a considered region of interest is very close to the function establishing a relation between focus values and locations within this considered region of interest since an optimal focus value for a target only depends on the distance between this target and the camera. As a consequence, determining the optimal focus ($F_{option}$) for a considered region of interest may consist in analyzing these regions of interest while varying the focus or in computing an optimal focus in view of the target distances within this region of interest. From this optimal focus, a focus blur may be determined by analyzing the region of interest or may be estimated as a function of the target distances within this region of interest.

According to embodiments, the optimal focus and the focus blur may be determined as a function of the distance map or focus map, denoted $f_{map}(x,y)$, as follows, for moving targets:

$$F_{optimum} = \mathrm{argmin}_F \left( \left\langle \left| F \times \frac{1}{f_{map}(x, y)} - \frac{1}{d_F} \right| \right\rangle_{(x,y)ROI} \right) \text{ and}$$

$$blur_A = A \times F_{optimum} \times \left\langle \left| \frac{1}{f_{map}(x, y)} - \frac{1}{d_F} \right| \right\rangle_{(x,y)ROI}$$

where $\langle \rangle_x$ corresponds to the operator "mean over x variable", $\mathrm{argmin}_x$ corresponds to the operator "argmin over x variable", $$\frac{1}{d_F}$$

is me focal distance, that is to say the real distance of an object from the camera, for which the representation in the image is sharp for the current focus value. If it is not available, it can be retrieved from the image distance denoted v that corresponds to the distance between the lens and the sensor, according to the following relation:

$$\frac{1}{d_F} + \frac{1}{v} = \frac{1}{F},$$

for stationary targets:

$$F_{optimum} = \mathrm{argmin}_F \left( \left\langle \left| 1 - \frac{f_{map}(x, y)}{F} \right| \right\rangle_{(x,y)motionlessROI} \right) \text{ and}$$

$$blur_A = A \times \left\langle \left| \frac{f_{map}(x, y)}{F_{optimum}} \right| \right\rangle_{(x,y)motionlessROI}$$

where motioniessROI corresponds to the considered region of interest wherein areas where motions are detected have been removed, as described by reference to FIG. 10c.

It is to be noted that the units of the results are given in the USI (m) for the focus blur and for the optimal focus. Regarding the focus blur, it is preferably expressed in pixels. This can be done according to the following formula:

$$blur_{A,pixels} = blur_{A,USI} \frac{resolution}{sensor\_size}$$

where resolution and sensor_size represent the resolution in pixels and the sensor size in USI, respectively.

The blur, comprising the motion bur and the focus bur (blur=$blur_S$+$blur_A$), is computed for each of the obtained images according to the previous relations and the obtained values are associated with the corresponding shutter speed and aperture values (the gain does not affect the blur) so as to determine the corresponding function or to build a 2-dimensional array wherein a blur value is associated with shutter speed and aperture values ($blur_{cal}(S, A)$).

Similarly, the contrast is computed for each of the obtained images. It may be obtained from the entropy according to the following relation:

$$\mathrm{contrast} = \frac{2^{entropy}}{2^{max\_entropy}}$$

where, for example, max_entropy is equal to 8 when the processed images are RGB images and each component is encoded over 8 bits.

Accordingly, the contrast $\mathrm{contrast}_{cal}(G, S, A)$ may be obtained from the entropy $E_{cal}(G, S, A)$. In other words, contrast values may be expressed as a function of the gain, of the shutter speed, and of the aperture values from the entropy expressed as a function of the gain, of the shutter speed, and of the aperture values.

Likewise, the contrast contrast(I) expressed as a function of the luminance may be obtained from the entropy E(I) that is also expressed as a function of the luminance. This can be done as a result of the following steps:

measuring the entropy of each of the obtained images;

determining the relationships between the measured entropy values and the camera settings, for example the gain, the shutter speed, and the aperture, denoted $E_{cal}$(G, S, A);

obtaining the previously determined relationships between the luminance values and the camera settings, for example the gain, the shutter speed, and the aperture, denoted $I_{cal}$(G, S, A);

discarding selected camera settings corresponding to gain values leading to noise values that exceed a predetermined noise threshold (the noise may have an impact on the entropy when the noise is too large and thus, by limiting noise to variance values below a predetermined threshold, for example 5 to 10, the impact is significantly reduced);

gathering the remaining entropy values and luminance values, that are associated with gain, shutter speed, and the aperture values, to obtain a reduced data collection of entropy and luminance values sharing the same camera settings. This data collection makes it possible to establish the relationships between entropy and luminance values, for example by using simple regression functions such as a linear interpolation on the entropy and luminance values;

determining the relationships between the contrast and the entropy as a function of the luminance, for example according to the following relation:

$$\mathrm{contrast}(I) = \frac{2^{E(I)}}{2^{max\_entropy}}$$

Turning back to FIG. 10a, it is illustrated how scene-dependent parameter values, for example target size and/or target velocity, may be obtained.

To that end, short sequences of consecutive images, also called chunks, are obtained. For the sake of illustration, ten to twenty chunks representative of the natural diversity of the targets are obtained.

According to particular embodiments, chunks are recorded by using the auto-mode (although the result is not perfect, the chunk analysis is robust to the blur and to the noise and thus, does not lead to significant errors). A motion detector of the camera can be used to detect motion and thus, to select chunks to be obtained.

The recording duration depends on the time it takes to get enough targets to reach statistical significance (10 to 20 targets is generally enough). Depending on the case, it can take only few minutes to several hours (if very few targets are spotted per hour).

In order to avoid waiting, it is possible to use chunk fetching instead of chunk recording (i.e. if the camera had already been used prior to the calibration step, the corresponding videos may be retrieved and used).

Alternatively, according to other embodiments, a user of the video surveillance system may be enabled to select the chunks to be used. The main advantage of this solution comes from the fact that such a user may know which chunks are representative of the targets that should be monitored by the system. Therefore, fewer chunks may be considered when the user manages to ensure that the relevant chunks have been chosen. It may even be possible for a user to select a single chunk. This makes the chunks determination and analysis process faster. To enable chunks selection, a dedicated user interface may be provided in the camera configuration user interface (e.g. as a specific tab in said camera configuration user interface). This enables a user to easily select chunks while configuring the camera. In addition, once chunks have been selected, a user interface may also advantageously provide access to the selected chunks and enable the selection to be edited by adding or removing chunks. This enables a user to check which chunks have been used for a given camera, and possibly to decide to replace them.

Chunks may be selected from among a set of existing recordings already recorded by a considered camera and displayed through a dedicated user interface; in this case, the user may be enabled to specify chunks as fragments of a recording, typically by indicating a start time and an end time. Multiple chunks may be specified from a single recording. Another solution may consist in enabling the user to record a chunk with a considered camera. By doing so, the user can easily create a chunk that contains the types of targets that should be monitored.

In any case, it may be also advantageous to clearly indicate to the user the status of chunks, i.e. whether the chunks have to be specified, whether the chunks are being processed, or whether the chunks have been processed. As a matter of fact, this enables a potential user who may be involved in the process to understand the behavior of the system; as long as the chunks have not been obtained, auto-setting cannot be fully operational. Once they have been obtained (from user or automatically), indicating that they are being processed enables the user to understand that auto-setting is not yet fully operational but that it will soon be. Finally, when chunks have been obtained and processed, the user can understand that auto-setting is fully operational (provided other steps of the auto-setting process have also been successfully performed). After being obtained, the chunks are analyzed to detect targets (step 1025) to make it possible to estimate (step 1030) theft size and preferably theft velocity and distance (for moving targets). This estimating step may comprise performing a statistical analysis of the values of the parameters of interest (e.g. target size, target velocity). Next, the mean, median, or any other suitable value extracted from the distribution of parameter values is computed and used as the value of reference.

The velocity of targets can be very accurately derived by tracking some points of interest of the target. By using this in combination with a background subtraction method (e.g. the known MOG or MOG2 method described, for example, in Zoran Zivkovic and Ferdinand van der Heijden, "*Efficient adaptive density estimation per image pixel for the task of background subtraction*". Pattern recognition letters, 27(7): 773-780, 2006), it is possible to avoid the detection of the fixed points of interest from the background and thus, to determine velocity with high accuracy even with blurry targets. The target velocity is simply the main velocity of points of interest.

Figure 11:
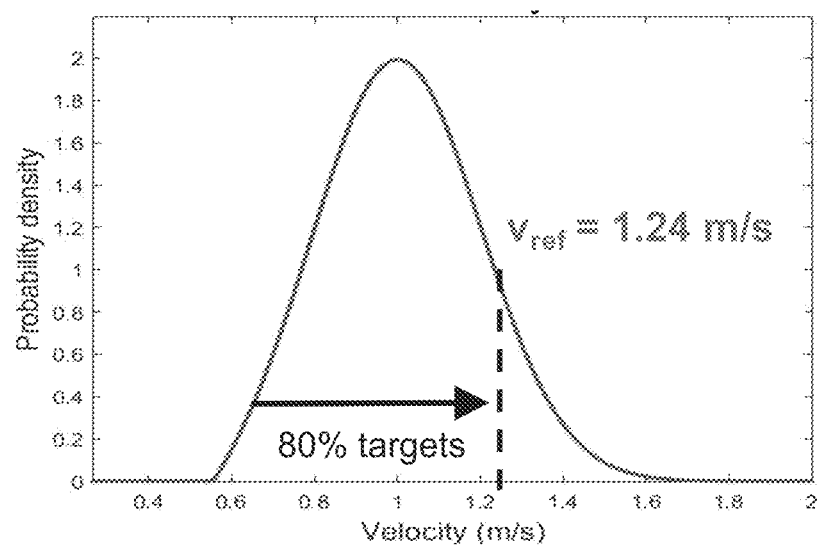
FIG. 11 illustrates an example of the distribution of the target velocity (or, similarly, the distribution of the velocity of the points of interest)

FIG. 11 illustrates an example of the distribution of the target velocity (or, similarly, the distribution of the velocity of the points of interest). From such a representation, a target velocity value may be obtained. For the sake of illustration, it can be chosen so as to correspond to the mean velocity for given targets. For the sake of illustration, one can choose a value corresponding to the "median 80%", i.e. a velocity value such that 80% of velocities are under this value and 20% of velocities are over this value.

The target size can be obtained through methods as simple as background subtraction, or more sophisticated ones like target detection algorithms (e.g. face recognition, human detection, or license plate recognition), which are more directly related to the detection of the targets corresponding to the task. Deep learning methods are also very effective. Outliers can be removed by using consensus-derived methods, or by using combinations of background subtraction and target detection at the same time. However, since only statistical results are obtained, it does not matter if some errors exist with such algorithms, since the errors should be averaged out to zero. This tolerance to errors makes such methods robust.

FIG. 10b is a block diagram illustrating an example of steps carded out for building a distance map of moving targets from a region of interest (ROI), a focus value (F), and images.

As illustrated, a first step is directed to target detection in a given region of interest in images (step 1050), for example in the images of the chunks obtained in step 1020. Detecting targets may be based on standard algorithms. For the sake of illustration, there exist deep learning-based computer vision methods that are really efficient for detecting well-known targets such as humans, pets, and vehicles, with a low error rate. Examples of such methods are known as "You Only Look Once" (YOLO, https://arxiv.org/pdf/1612.08242.pdf), "Single Snapshot MultiBox Detector" (SSD, https://arxiv.org/pdf/1512.02325.pdf), and "Faster RCNN" (https://arxiv.org/pdf/1506.01497pdf).

This makes it possible to localize the targets of interest depending on theft types. As a result, for each analyzed image, a bounding box surrounding the identified target is obtained. The bounding box height and width correspond approximately to the target size denoted bounding_box_size.

Next, the poses of the detected targets are estimated (step 1055). This can be done by using similar techniques of computer vision based on the image of each detected target, which make it possible to determine the angle of the target relative to the camera and thus, to estimate its pose.

Next, a target size is obtained for as many locations as possible of the considered region of interest, resulting in a target size map (step 1060). To that end, the real size, for example in pixels, is estimated for each detected target, for example according to the following formula:

$$target_{size} = \frac{bounding\_box\_size}{\cos(\alpha)}$$

where bounding_box_size is the apparent size of the detected target as obtained in step 1050, and α is the angle of the detected target relative to the camera as obtained in step 1055, The results for all the detected targets and all the analyzed images are concatenated. It is to be noted that for each detected target, a point of reference can be used, for example the centroid of the bounding box and the target size can be associated with this point.

As a result, a collection of sizes associated with locations in the considered region of interest is obtained. It can be represented as a list of target sizes {size0, size1, ..., sizen} associated with a list of coordinates {(x0,y0), (x1, y1), ..., (xn,yn)}, where sizei is the target size value corresponding to the location having index i.

These results are then used to obtain a map of the target size (target size map). This can be done by using a regression method, such as linear or nonlinear regression (e.g. svm, gradient boosting, or even deep-learning techniques) applied to the size results associated with the coordinates.

Next, the distance map is computed (step 1065). This can be done by converting the obtained target size map, where sizes are expressed in pixels, into a distance map, for example according to the following formula, applied to each location of the target size map:

$$distance = F \frac{real\_size}{pixel\_size}$$

where

F is the focus value used during image acquisition (corresponding to the settings of the camera), real_size is the real-world size of the target (that may be determined statistically by using a priori knowledge about the targets, for example, it can be set that the mean size of adults is ~1.75 m). In order to increase the accuracy of such value, the median size or any derivative of the statistical size of the targets can also be used, and pixel_size is obtained from each point of the considered region of interest as computed during step 1065. The result is a distance map, i.e. a function distance=(x,) for each location (x,y) of the considered region of interest.

Steps 1050 to 1065 of FIG. 10b may be carried out during steps 1025 and 1030 of FIG. 10a.

FIG. 10c is a block diagram illustrating an example of steps cared out for building a focus map of stationary targets from a region of interest and images.

It is observed that stationary targets like machinery or buildings can be very diverse in nature. Therefore, since every building is unique and since there are so many existing machines, recognizing such types of targets according to common features would not be efficient.

However, these targets being stationary or at least partially stationary, it is possible to compare their representation in different images, in particular in images obtained with different focus values so as to determine an optimal focus value for each area of the considered region of interest, making it possible to build a focus map associating a focus value with each location of the considered region of interest.

As illustrated in FIG. 10c, a first step is directed to sampling the focus values that are available in the camera in order to get a finite number of focus values and to obtain at least one image for each sampled focus value (step 1070). For the sake of illustration, a linear sampling of the focus values F may be performed or a more sophisticated sampling such as a linear sampling of the inverse value of focus values 1/F. According to other embodiments, the default sampling of the camera can be used (it being noted that most of the cameras have only a limited number of available focus values).

The images corresponding to each of the sampled focus values are preferably obtained from the obtained chunks (for example the chunks obtained at step 1020).

Next, the obtained images are analyzed to identify areas where motion is detected (step 1075). According to embodiments, areas wherein few movements are detected are not considered. Such detection can be based on a standard motion detection mechanism, by using a motion activity threshold.

As a result, a subpart of the considered region of interest where no motion or small movements have been detected (I.e. corresponding to the considered region of interest wherein the areas where movements have been detected are removed) is obtained. It is referred to as the motionless region of interest (denoted motioniessROI).

Next, an optimal focus is determined for each location of the motion less region of interest (step 1080), so that the obtained sharpness is at a maximum value. in other words, the focus that provides the maximum microcontrast in the vicinity of this point is determined. As a consequence, the focus blur is minimum (as dose as possible to 0) for this focus value. Several techniques make it possible to analyse the blur or the microcontrast of a point or some points.

Accordingly, for each location of the motionless region of interest, a focus value providing a maximum microcontrast is obtained, leading to a list of locations or points denoted $\{(x0,y0), (x1,y1) \ldots, (xn,yn)\}$ and to a list of corresponding focus values denoted $\{focus0, focus1, \ldots focusn\}$, where focusi is the focus value corresponding to a maximum microcontrast for the location having index i.

Since the motionless region of interest may comprise areas where small movements have been detected, the previous analysis may lead to sources of uncertainty and thus to outliers.

In order to increase the accuracy and remove these outliers, a regression performed on the focus values and locations may be performed using well-known regression technique such as linear or nonlinear regression (e.g. svm, gradient boosting, or even deep-learning techniques) to obtain a mapping associating a focus value with a location for each point of the motionless region of interest (denoted focus=(x,y). As described above, this mapping is referred to as the focus map.

Operation Phase

As described previously, the operation phase aims at improving camera settings, preferably at determining optimal (or near-optimal) camera settings for a current mission and current environmental conditions, without perturbing significantly the use of the camera. To that end, the operation phase is based on a prediction mechanism (and not on an exploration/measurement mechanism). It uses, in particular, the quality function ($f_{quality}$) determined in the learning phase, the relationships between image quality parameters and camera settings (e.g. $noise_{cal}(G, S, A)$, $blur_{cal}(G, S, A)$, and $contrast_{cal}(G, S, A)$) determined during the calibration phase, scene-dependent parameters also determined during the calibration phase, and image metrics relating to images obtained with the current camera settings.

Indeed, since the environmental conditions of the calibration phase and the current environmental conditions (i.e. during the operation phase) are not the same, the new relationships between image quality parameters and camera settings should be predicted so as to determine camera settings as a function of the quality function, without perturbing the camera.

According to embodiments, the noise may be predicted from the gain, independently from the shutter speed and the aperture. Moreover, it is independent from lighting conditions. Therefore, the relationships between the noise and the gain for the current environmental conditions may be expressed as follows:

$$noise_{current}(G)=noise_{cal}(G)$$

wherein the nose value associated with a given gain value corresponds to the mean noise for this gain and all the shutter speed values associated with it.

If a noise value should be determined for a gain value that has not been selected during the calibration phase (i.e., if there is a gain value for which there is no corresponding noise value), a linear interpolation may be carried out.

Table 1 in the Appendix gives an example of the relationships between the noise and the gain.

Still according to embodiments, the blur may be determined as a function of the target velocity and the shutter speed (motion blur) and of the aperture (focus blur), as described above. R does not depend on lighting conditions. Accordingly, the relationships between the blur and the shutter speed and the aperture for the current environmental conditions may be expressed as follows:

$$blur_{current}(G, S, A)=blur_{cal}(S, A)$$

Table 2 in the Appendix gives an example of the relationships between the blur and the shutter speed.

Still according to embodiments, prediction of the contrast as a function of the camera settings according to the current environmental conditions (denoted $contrast_{current}(G, S, A)$) comprises prediction of the luminance as a function of the camera settings for the current environmental conditions (denoted $l_{current}(G, S, A)$) and the use of the relationships between the contrast and the luminance (contrast(l)) according to the following relation:

$$contrast_{current}(G, S, A)=contrast_{current}(l_{current}(G, S, A))$$

Prediction of the luminance as a function of the camera settings for the current environmental conditions ($l_{current}(G, S, A)$) may be based on the luminance expressed as a function of the camera settings for the calibration environmental conditions (noted $l_{cal}(G, S, A)$) and on a so-called shutter shift method.

The latter is based on the assumption that there is a formal similarity between a change in lighting conditions and a change in shutter speed. Based on this assumption, the current luminance $l_{act}$ may be expressed as follows:

$$l_{act}=l_{current}(G_{act}, S_{act}, A_{act})=l_{cal}(G_{act}, S_{act}+\Delta S, A_{act})$$

where ($G_{act}, S_{act}, A_{act}$) is the current camera settings and $\Delta S$ is a shutter speed variation.

Therefore, the relationship between the luminance and the camera settings for the current environmental conditions may be determined as follows:
- interpolating the computed luminance values $l_{cal}(G, S, A)$ to obtain a continuous or pseudo-continuous function:
- for the current gain $G_{act}$, determining $\Delta S$ so that $l_{cal}(G_{act}, S_{act}+\Delta S, A_{act})=l_{act}$ for example by using the inverse function of the luminance expressed as a function of the shutter speed (for the current gain $G_{act}$), i.e. the shutter speed expressed as a function of the luminance, and computing $\Delta S$ as $\Delta S=S(l_{act})-S_{act}$; and
- determining the whole function $l_{current}(G,S, A)$ by using the formula $l_{current}(G, S, A)=l_{cal}(G, S+\Delta S, A)$ However, if the assumption that there is a formal similarity between a change in lighting conditions and a change in shutter speed is correct in the vicinity of the current camera settings, it is not always true for distant camera settings. Accordingly, an iterative process may be used to determine the camera settings to be used, as described hereafter.

Table 3 in the Appendix gives an example of the relationships between the contrast and the gain, the shutter speed, and the aperture.

After having predicted the image quality parameters for the current environmental conditions, optimization of the current camera settings may be carried out. It may be based on a grid search algorithm according to the following steps:
sampling the manifold of possible gain, shutter speed, and aperture values to create a 3D grid of different ($G_{pred}$, $S_{pred}$, $A_{pred}$) triplets;
for each of the ($G_{pred}$, $S_{pred}$, $A_{pred}$) triplets, denoted ($G_{pred,i}$, $S_{pred,j}$, $A_{pred,j}$) computing the values of the image quality parameters according to the previous predictions (noise$_{current}$($G_{pred,i}$), blur$_{current}$($S_{pred,j}$, $A_{pred,k}$) and contrast$_{current}$(l($G_{pred,i}$, $S_{pred,j}$, $A_{pred,k}$)));
for each ($G_{pred,i}$, $S_{pred,j}$, $A_{pred,k}$) triplet, computing a score as a function of the quality function determined during the learning phase, of the current mission (mission$_{act}$), of the computed values of the image quality parameters, and of resource consumption (as described above), as follows:

$$\text{score}_{i,j,k} = f_{score}(\alpha f_{quality}(\text{mission}_{act})\ (\text{noise}_{current}(G_{pred,i}), \text{blur}_{current}(S_{pred,j}, A_{pred,k}), \text{and contrast}_{current}(l(G_{pred,i}, S_{pred,j}, A_{pred,k})), \text{target\_size, target\_velocity}), \{\delta\beta f_{resource}\}_i)$$

where target_size and target_velocity values have been calculated during the calibration phase,
identifying the best score (or one of the best scores), i.e. max(score$_{ij}$), to determine the camera settings to be used, i.e. ($G_{next}$, $S_{next}$, $A_{next}$)=argmax(score$_{i,j,k}$).

Table 4 in the Appendix gives an example of the relationships between the score and the gain, the shutter speed, and the aperture.

In order to improve the accuracy of the camera settings, the latter may be determined on an iterative basis (in particular to take into account that the assumption that there is a formal similarity between a change in lighting conditions and a change in shutter speed is not always true for distant camera settings).

Accordingly, after the next camera settings have been determined, as described above, and set, the luminance corresponding to these next camera settings is predicted ($l_{pred}=l_{current}(G_{next}, S_{next}, A_{next})$) a new image corresponding to these camera settings is obtained, and the luminance of this image is computed. The predicted luminance and the computed luminance are compared.

If the difference between the predicted luminance and the computed luminance exceeds a threshold, for example a predetermined threshold, the process is repeated to determine new camera settings. The process may be repeated until the difference between the predicted luminance and the computed luminance is less than the threshold or until camera settings are stable.

It is to be noted that region of interests (ROIs) may be taken into account for determining image quality parameter values (in such a case, the image quality parameter values are determined from the ROIs only) and for optimizing camera settings.

Figure 12:
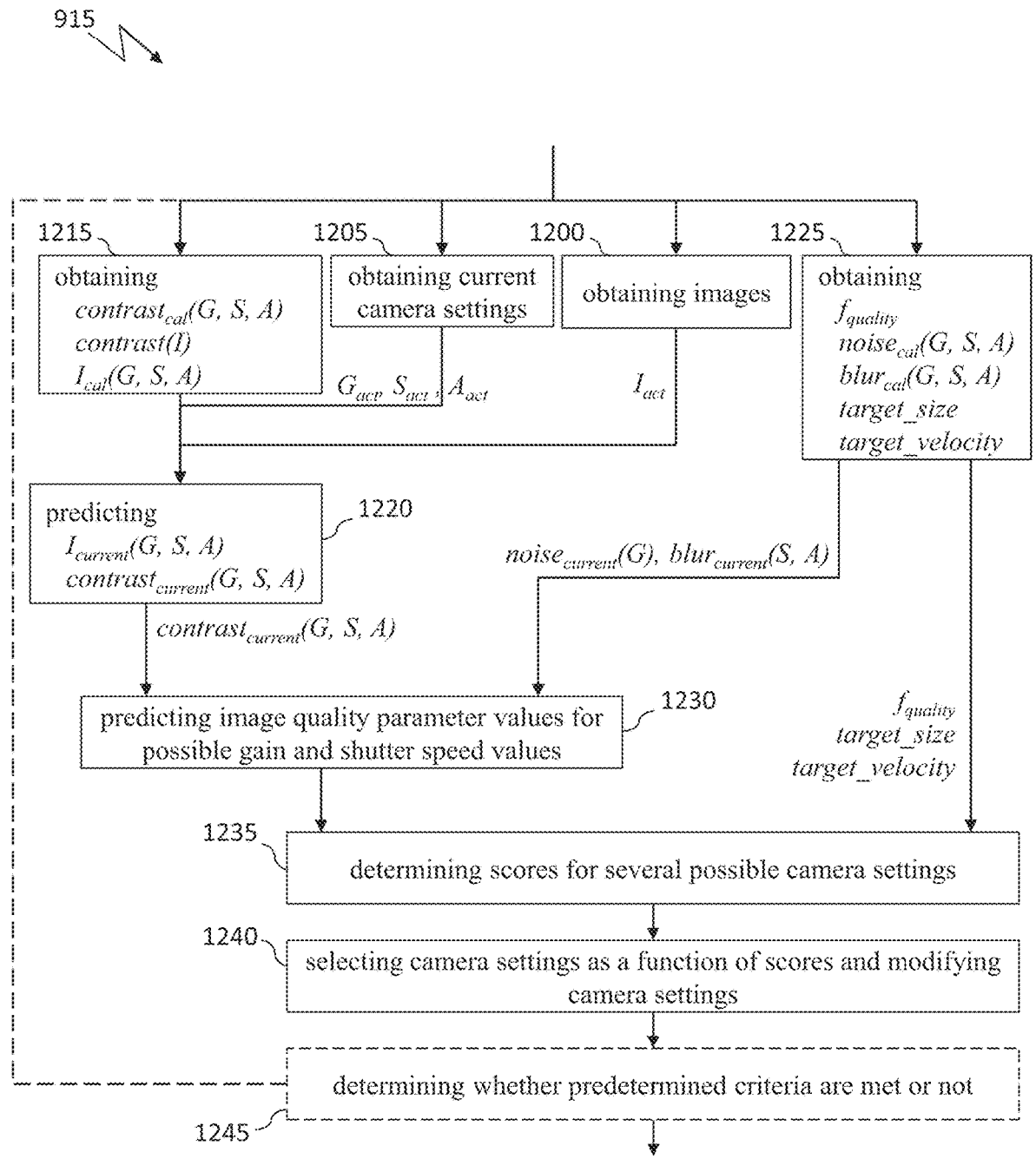
FIG. 12 illustrates an example of steps for determining new camera settings during the operational use of a camera, without perturbing the use of the camera.

FIG. 12 illustrates an example of steps for determining new camera settings during the operational use of a camera, without perturbing the use of the camera. This may correspond at least partially to step 915 in FIG. 9.

As illustrated, first steps are directed to:
obtaining images (step 1200) from a camera set with current camera settings, from which an actual luminance ($l_{act}$) may be computed,
obtaining these camera settings (step 1205), i.e. the actual gain, the shutter speed, and aperture ($G_{act}$, $S_{act}$, $A_{act}$) in the given example, and
obtaining the relationships (step 1215) between the contrast and the camera settings for the calibration environmental conditions (contrast$_{cal}$(G, S, A)), between the contrast and the luminance (contrast(l)), and between the luminance and the camera settings for the calibration environmental conditions ($l_{cal}$(G, S, A)).

Next, the relationships between the luminance and the camera settings for the current environmental conditions ($l_{current}$(G, S, A)) and the relationship between the contrast and the camera settings for the current environmental conditions (contrast$_{current}$(G, S, A)) are predicted (step 1220), for example using the method and formula described above.

In parallel, before, or after, the quality function ($f_{quality}$), the relationships between the noise and the camera settings for the calibration environmental conditions (noise$_{cal}$(G, S, A)), the relationships between the blur and the camera settings for the calibration environmental conditions (blur$_{cal}$(G, S, A)), and the scene-dependent parameter values, e.g. the target size and preferably the target velocity, are obtained (step 1225).

Next, these relationships as well as the relationships between the contrast and the camera settings for the current environmental conditions (contrast$_{current}$(G, S, A)) are used to predict image quality parameter values for possible gain, shutter speed, and aperture values (step 630). As described above, these image quality parameter values may be computed for different ($G_{pred}$, $S_{pred}$, $A_{pred}$) pairs forming a 3D grid.

These image quality parameter values are then used with the scene-dependent parameter values to compute scores according to the previously obtained quality function (step 1235). According to embodiments, a score is computed for each of the predicted image quality parameter values.

Next, optimized camera settings are selected as a function of the obtained scores and the settings of the camera are modified accordingly (step 1240).

According to embodiments, it is determined whether or not predetermined criteria are met (step 1245), for example whether or not the actual luminance of an obtained image is dose to the predicted luminance.

If the criteria are met, the process is stopped until a new optimization of the camera settings should be made. Otherwise, if the criteria are not met, new camera settings are estimated, as described above.

According to embodiments and as described above, prediction of the luminance as a function of the camera settings for the current environmental conditions ($l_{pred}$(G, S, A) or $l_{current}$(G, S, A)) may be based on the luminance expressed as a function of the camera settings for the calibration environmental conditions ($l_{cal}$(G, S, A)) and computed according to the shutter shift method.

However, it has been observed that the accuracy of the results obtained according to these embodiments is increasingly better when current environmental conditions get closer to the calibration environmental conditions and that it decreases when current environmental conditions deviate from the calibration environmental conditions. This may lead to prediction errors, e.g. when trying at night to apply the results of a calibration performed at the brightest hours of a day for an outdoor camera.

Accordingly, it may be efficient to determine the relationships between the luminance and the camera settings for different calibration environmental conditions (denoted $I_{cal}^i$(G, S, A)), i varying, for example, from 0 to n.

In such a case, the relationships between the luminance and the camera settings to be used for the current environmental conditions may be selected from among all the relationships between the luminance and the camera settings determined during the calibration phase ($I^i_{cal}(G, S, A)$) so that:

$$i = \operatorname{argmin}_i(|I_{act} - I_{cal}^i(G_{act}, S_{act}, A_{act})|)$$

In other words, the relationships associated with the calibration environmental conditions i are selected so as to minimize the gap between the measured luminance ($I_{act}$) and the luminance ($I_{cal}^i(G_{act}, S_{act}, A_{act})$) obtained in the same conditions (i.e. for same G, S, and A as in the current situation).

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims. In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of setting at least one module of a set of image acquisition and processing modules in a video system, the modules of the set of image acquisition and processing modules sharing at least one same resource, a task to perform being assigned to each module of the set of modules, the method comprising:
   obtaining, for each module of the set of modules, a score function depending on:
      a value characterizing an efficiency for the considered module to perform the task to which it is assigned,
      a level of consumption of the at least one same resource by the considered module, and
      a trade-off value characterizing the importance of the efficiency of performing a task relative to resource consumption of the at least one same resource, one trade-off value being associated with each at least one same resource,
   determining an updated value of the trade-off value of the at least one same resource, the trade-off value of the at least one same resource being updated so that the level of consumption of the at least one same resource reaches a resource consumption threshold;
   identifying settings of the at least one module of the set of modules, the identified settings optimizing a result of the score function of the at least one module when considering the updated trade-off value; and
   setting the at least one module according to the identified settings,
   wherein the score function increases when the value characterizing an efficiency for the considered module to perform the task to which it is assigned increases and the score function decreases when the level of consumption of the at least one same resource increases.

2. The method of claim 1, wherein identifying settings and setting a module according to identified settings are carried out independently for each module of the set of modules.

3. The method of claim 1, wherein the video system comprises a plurality of shared resources and wherein determining an updated value of a trade-off value is carried out independently for each shared resource of the plurality of shared resources.

4. The method of claim 1, wherein determining an updated value of a trade-off value for a considered shared resource comprises:
   obtaining a resource consumption target for the considered shared resource;
   obtaining consumption measurements of the considered shared resource;
   computing an updated value of the trade-off value for the considered shared resource in a controller using a control loop feedback mechanism, in response to the obtained resource consumption target and the obtained consumption measurements.

5. The method of claim 1, wherein determining an updated value of a trade-off value for a considered shared resource comprises:
   obtaining a resource consumption target for the considered shared resource;
   obtaining a load balancing model for the considered shared resource;
   obtaining values of scene parameters of a scene represented on images acquired or processed by at least one module using the considered shared resource;
   computing an updated value of the trade-off value for the considered shared resource as a function of the load balancing model in response to the obtained resource consumption target and the obtained scene parameter values.

6. The method of claim 1, wherein determining an updated value of a trade-off value for a considered shared resource comprises:
   obtaining a resource consumption target for the considered shared resource;
   obtaining a load balancing model for the considered shared resource;
   obtaining consumption measurements of the considered shared resource;
   obtaining values of scene parameters of a scene represented on images acquired or processed by at least one module using the considered shared resource;
   computing an updated value of the trade-off value for the considered shared resource as a function of an output of a controller using a control loop feedback mechanism, in response to the obtained resource consumption target and the obtained consumption measurements, and of an output of the load balancing model in response to the obtained resource consumption target, and the obtained scene parameter values.

7. The method of claim 1, wherein a value characterizing an efficiency for a module to perform a task is obtained from a quality function providing a quality score component corresponding to how likely the task is to be completed, as a function of current settings of the corresponding module.

8. The method of claim 7, wherein the quality function is further based on variables the values of which have an effect on the performance of the corresponding module.

9. The method of claim 1, wherein the trade-off value characterizing the importance of the efficiency of performing a task relative to resource consumption of the at least one same resource is obtained from a resource consumption function providing a resource consumption score component corresponding to how much the at least one same resource is likely to be used by the considered module, as a function of current settings of the considered module.

10. The method of claim 9, wherein the resource consumption function is further based on variables the values of which have an effect on the resource consumption by the considered module.

11. The method of claim 1, wherein the score function further depends on a weighting factor corresponding to how important the considered module is considered.

12. A computer program product for a programmable apparatus, the computer program product comprising instructions for carrying out each step of the method according to claim 1 when the program is loaded and executed by a programmable apparatus.

13. A non-transitory computer-readable storage medium storing instructions of a computer program for implementing the method according to claim 1.

14. A device for setting at least one module of a set of image acquisition and processing modules in a video system, the modules of the set of image acquisition and processing modules sharing at least one same resource, a task to perform being assigned to each module of the set of modules, the device comprising a microprocessor, wherein the microprocessor obtains, for each module of the set of modules, a score function depending on:
  a value characterizing an efficiency for the considered module to perform the task to which it is assigned,
  a level of consumption of the at least one same resource by the considered module, and
  a trade-off value characterizing the importance of the efficiency of performing a task relative to resource consumption of the at least one same resource, one trade-off value being associated with each at least one same resource,
  the microprocessor determines an updated value of the trade-off value of the at least one same resource, the trade-off value of the at least one same resource being updated so that the level of consumption of the at least one same resource reaches a resource consumption threshold;
  the microprocessor identifies settings of the at least one module of the set of modules, the identified settings optimizing a result of the score function of the at least one module when considering the updated trade-off value; and
  the microprocessor sets the at least one module according to the identified settings,
  wherein the score function increases when the value characterizing an efficiency for the considered module to perform the task to which it is assigned increases and the score function decreases when the level of consumption of the at least one same resource increases.

15. The device of claim 14, wherein the microprocessor is further configured so that identifying settings and setting a module according to identified settings are carried out independently for each module of the set of modules and/or so that the video system comprises a plurality of shared resources, determining an updated value of a trade-off value being carried out independently for each shared resource of the plurality of shared resources.

16. The device of claim 14, wherein the microprocessor is further configured so that determining an updated value of a trade-off value for a considered shared resource comprises:
  obtaining a resource consumption target for the considered shared resource;
  obtaining consumption measurements of the considered shared resource;
  computing an updated value of the trade-off value for the considered shared resource in a controller using a control loop feedback mechanism, in response to the obtained resource consumption target and the obtained consumption measurements.

17. The device of claim 14, wherein the microprocessor is further configured so that determining an updated value of a trade-off value for a considered shared resource comprises:
  obtaining a resource consumption target for the considered shared resource;
  obtaining a load balancing model for the considered shared resource;
  obtaining values of scene parameters of a scene represented on images acquired or processed by at least one module using the considered shared resource;
  computing an updated value of the trade-off value for the considered shared resource as a function of the load balancing model in response to the obtained resource consumption target and the obtained scene parameter values.

18. The device of claim 14, wherein the microprocessor is further configured so that determining an updated value of a trade-off value for a considered shared resource comprises:
  obtaining a resource consumption target for the considered shared resource;
  obtaining a load balancing model for the considered shared resource;
  obtaining consumption measurements of the considered shared resource;
  obtaining values of scene parameters of a scene represented on images acquired or processed by at least one module using the considered shared resource;
  computing an updated value of the trade-off value for the considered shared resource as a function of an output of a controller using a control loop feedback mechanism, in response to the obtained resource consumption target and the obtained consumption measurements, and of an output of the load balancing model in response to the obtained resource consumption target, and the obtained scene parameter values.

19. The device of claim 14, wherein the microprocessor is further configured so that a value characterizing an efficiency for a module to perform a task is obtained from a quality function providing a quality score component corresponding to how likely the task is to be completed, as a function of current settings of the corresponding module, the quality function being further based on variables the values of which have an effect on the performance of the corresponding module.

20. The device of claim 14, wherein the microprocessor is further configured so that the trade-off value characterizing the importance of the efficiency of performing a task relative to resource consumption of the at least one same resource is obtained from a resource consumption function providing a resource consumption score component corresponding to how much the at least one same resource is likely to be used by the considered module, as a function of current settings of the considered module, the resource consumption function being further based on variables the values of which have an effect on the resource consumption by the considered module.

* * * * *